(12) United States Patent
Zheng

(10) Patent No.: US 8,223,648 B2
(45) Date of Patent: Jul. 17, 2012

(54) METHOD AND APPARATUS FOR SYNCHRONIZING TIME IN A PASSIVE OPTICAL NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/269,483

(22) Filed: Oct. 7, 2011

(65) Prior Publication Data

US 2012/0027405 A1     Feb. 2, 2012

Related U.S. Application Data

(63) Continuation of application No. 12/942,196, filed on Nov. 9, 2010, which is a continuation of application No. PCT/CN2009/071598, filed on Apr. 30, 2009.

(30) Foreign Application Priority Data

May 9, 2008   (CN) .......................... 2008 1 0096171

(51) Int. Cl.
  H04L 12/26   (2006.01)
  H04L 7/00    (2006.01)
  H04J 3/06    (2006.01)
  H04B 1/00    (2006.01)

(52) U.S. Cl. ..................... 370/236.2; 370/510; 370/512; 375/354; 398/154

(58) Field of Classification Search ....... 370/236–236.2, 370/503, 509–514; 375/354–370; 398/154–156
See application file for complete search history.

(56) References Cited

U.S. PATENT DOCUMENTS

| 7,376,136 | B2 * | 5/2008 | Song et al. ............... 370/392 |
| 2003/0048801 | A1 | 3/2003 | Sala et al. |
| 2005/0129030 | A1 | 6/2005 | Choi et al. |
| 2007/0291777 | A1 * | 12/2007 | Jamieson et al. ............ 370/401 |
| 2008/0080562 | A1 | 4/2008 | Burch et al. |
| 2009/0067850 | A1 * | 3/2009 | Mizutani et al. ............ 398/154 |
| 2009/0274461 | A1 * | 11/2009 | Xu et al. ..................... 398/66 |
| 2010/0040369 | A1 * | 2/2010 | Zhao et al. ................. 398/58 |
| 2010/0142944 | A1 * | 6/2010 | Zou ............................ 398/25 |
| 2011/0052206 | A1 * | 3/2011 | Zheng ........................ 398/154 |
| 2011/0129218 | A1 * | 6/2011 | Kim ........................... 398/45 |
| 2012/0020662 | A1 * | 1/2012 | Ding et al. .................. 398/38 |

FOREIGN PATENT DOCUMENTS

CN         1507206 A     6/2004
(Continued)

OTHER PUBLICATIONS

ITU, G.984.3 Gigabit-capable Passive Optical Networks (G-PON): Transmision Convergence layer specification, Feb. 2004, p. 24.*

(Continued)

Primary Examiner — Tri H Phan

(57) ABSTRACT

A method and apparatus for synchronizing time in a Gigabit Passive Optical Network (GPON) in which an Optical Line Terminal (OLT) sends a downstream frame including a Physical Control Block downstream (PCBd) field and a payload field to an Optical Network Unit (ONU); the OLT determines a time value associated with a certain bit in the PCBd field of the downstream frame; and the OLT sends an Operation, Administration and Maintenance (OAM) message defined by a GPON protocol carrying the time value to the ONU, wherein the ONU uses the time value to adjust a local time of the ONU.

28 Claims, 25 Drawing Sheets

FOREIGN PATENT DOCUMENTS

| | | |
|---|---|---|
| CN | 1845546 A | 10/2006 |
| CN | 1921461 A | 2/2007 |
| CN | 101083657 A | 12/2007 |
| CN | 101577600 A | 11/2009 |
| EP | 1953937 A1 | 8/2008 |
| KR | 20030073484 A | 9/2003 |

OTHER PUBLICATIONS

International Search Report of PCT Patent Application No. PCT/CN2009/071598, mailed on Jul. 16, 2009, 6 pages total.

English Translation for Written Opinion of PCT Patent Application No. PCT/CN2009/071598, dated Jul. 16, 2009, 4 pages total.

Kannisto et al., "Software and Hardware Prototypes of the IEEE 1588 Precision Time Protocol on Wireless LAN", Local and Metropolitan Area Network, 2005, Lanman, 2005. The 14th IEEE Workshop on Chania, Crete, Greece, Sep. 18-21, 2005, Piscataway, NJ, USA, IEEE, Sep. 18, 2005, 6 pages total.

Supplementary European Search Report of European Patent Application No. 09741699.4, dated May 26, 2011, 7 pages total.

International Telecommunications Union, ITU-T G.984.3 Amendment 2, Series G: Transmission Systems and Media, Digital Systems and Networks, Digital sections and digital line system—Optical line systems for local and access networks; "Gigabit-capable Passive Optical Networks (G-PON): Transmission convergence layer specification: Amendment 2," dated Mar. 2006, 14 pages total.

First Office Action of corresponding Chinese Patent Application No. 200810096171.3, mailed Mar. 31, 2012, and English translation thereof, 34 pages total.

IEEE Std 1588™: "IEEE Standard for a Precision Clock Synchronization Protocol for Networked Measurement and Control Systems", TC9—Technical Committee on Sensor Technology,IEEE Instrumentation and Measurement Society, IEEE-SA Standards Board, Sep. 12, 2002,154 pages total.

* cited by examiner

METHOD AND APPARATUS FOR SYNCHRONIZING TIME IN A PASSIVE OPTICAL NETWORK

CROSS-REFERENCE TO RELATED APPLICATIONS

This application is a continuation of U.S. patent application Ser. No. 12/942,196, filed on Nov. 9, 2010, which is a continuation of International Application No. PCT/CN2009/071598, filed on Apr. 30, 2009. The International Application claims priority to Chinese Patent Application No. 200810096171.3, filed on May 9, 2008. The aforementioned patent applications are hereby incorporated by reference in their entireties.

TECHNICAL FIELD

The present invention relates to the field of optical communications, and in particular, to a method and apparatus for synchronizing time in a passive optical network.

BACKGROUND

A Passive Optical Network (PON) includes an Optical Distribution Network (ODN), which contains no electronic devices or electronic power sources and is entirely composed of passive devices such as optical splitters. A PON includes an Optical Line Terminal (OLT) installed in a central office and a batch of Optical Network Units (ONUs) installed at the customer premises. Three PON technologies are provided: Asynchronous Transfer Mode Passive Optical Network (APON), Ethernet Passive Optical Network (EPON) and Gigabit Passive Optical Network (GPON). EPON and GPON also are evolving to the next generation PON (xPON).

Taking GPON as an example, the GPON protocol stack is illustrated in FIG. 1. The GPON protocol stack includes three layers, and they are briefly introduced in a down to top sequence.

One layer is the GPON Physical Medium Dependent (GPM) layer, which is responsible for the transmission of GPON Transmission Convergence (GTC) layer frames on optical fibers. It transmits optical signals from the optical fibers to the PON Media Access Control (MAC) layer for data processing and converts data signals received from the PON MAC layer into optical signals.

A second layer is the MAC layer. For GPON, the MAC layer is a GTC layer, which includes two sub-layers:

(a) TC Adapter Sublayer

The TC adapter sub-layer is responsible for fragmenting service data received from an Asynchronous Transfer Mode (ATM) client into ATM cells and fragmenting service data received from a GPON Encapsulation Method (GEM) client into GEM data blocks; the TC adapter sub-layer is also responsible for assembling ATM cells or GEM data blocks in a GTC frame to appropriate service data.

(b) GTC Framing Sub-Layer

The GTC framing sub-layer is responsible for assembling GTC TC frames. Specifically, the GTC framing sub-layer adds a GTC TC frame header before an ATM cell or a GEM data block according to control information of Physical Layer Operation, Administration and Maintenance (PLOAM) to create a complete GTC TC frame and send the frame to the GPM layer; the GTC framing sub-layer is also responsible for removing frame header information from a GTC TC frame received from the GPM layer and sending the frame with the frame header information removed to the TC adapter sub-layer for processing.

The GPON also has a third layer, which includes the ATM client, GEM client and the following units:

(1) PLOAM: responsible for functions like operation, administration and maintenance at the PON physical layer; and (2) ONU Management and Control Interface (OMCI): the OLT controls an Optical Network Terminal (ONT) via the OMCI; like common service data, OMCI data can be encapsulated to ATM cells or GEM data blocks for transmission.

IEEE 1588 is the Precision Time Protocol (PTP) of a system for network measurement and control, and implements synchronization of the slave clock of an ONT (client device) with the master clock of the main control device by sending/receiving clock packets. The principle of the IEEE 1588 PTP protocol is described as follows: Based on the most precise time when the synchronization packets are sent and received, each slave clock exchanges synchronization packets with the master clock to achieve synchronization with the master clock.

The synchronization process includes two stages: offset measurement stage and delay measurement stage.

FIG. 2A illustrates the offset measurement stage where the master clock broadcasts two messages to all nodes on the network:

1. sync message: denoting desired time for sending the message
2. follow-up message: denoting actual time for sending the message The sync messages are sent automatically at given intervals. The follow-up messages are employed to calculate the transmission delay caused by the local protocol when packets are sent. The master clock sends determined sync messages at regular intervals (generally once every two seconds). The sync message contains a time stamp, which describes precisely the desired time the packet is sent. Assume that the time of the master clock before synchronization is Tm=128 s and that the slave clock time is Ts=111 s. The master clock measures that the precise sending time is Tm1 and the slave clock measures that the precise receiving time is Ts1. Because the sync message contains the desired sending time instead of the actual sending time, the master clock sends a follow-up message which contains a time stamp that records precisely the actual sending time Tm1 of the sync message. Thus, the slave clock can calculate the offset between the slave clock and the master clock according to the actual sending time in the follow-up message and the actual receiving time of the receiver:

$$\text{Offset}=Ts1-Tm1-\text{Delay}=111.75-128.5-0=16.75 \text{ s}$$

The "delay" above means the transmission delay between the master clock and the slave clock and will be measured in the following measurement stage. At the current stage, the delay is unknown and assumed to be 0.

At the offset measurement stage, Adjust Time can be obtained and the slave clock is adjusted to:

$$\text{Adjust Time}=Ts-\text{Offset}$$

The second stage is the delay measurement stage as shown in FIG. 2B.

The delay measurement stage measures the delay caused by network transmission. The measurement is achieved through exchange of the following messages between the master clock and the slave clock:

1. The slave clock sends a Delay Request message, informing the master clock, "I send the Delay Request message at this moment."

2. The master clock sends a Delay Response message, informing the slave clock, "I receive your Delay Request message at this moment."

The slave clock sends the Delay Request at Ts3=130.75 s after receiving the sync message. The master clock sends the Delay Response to the slave clock after receiving the Delay Request and marks the precise receiving time Tm3=131.25 s in the Delay Response. Thus, the slave clock can calculate the accurate network delay.

Delay=(Tm3−Ts3)/2=(131.25−130.75)/2=0.25

IEEE 802.3 defines the basic structure of an Ethernet frame, including: preamble, Start Frame Delimiter (SFD), destination address, source address, length field, data field, and frame check sequence.

As shown in FIG. 3, the preamble consists of 8 bits of alternated 1s and 0s. The SFD includes 8 bits where the first 6 bits are alternated 1s and 0s and the last 2 bits are "1, 1" indicating the start of the frame to the receiver. Following the two bits are the actual fields of the frame.

In Ethernet, all clock packets defined by IEEE 1588/1588v2 are transmitted in the form of IP multicast packets. The packet time stamp generating point for determining the time a clock packet is transmitted or received is located at the last bit of the SFD.

During the implementation of the present invention, the inventor found some weaknesses in the prior art, described as follows. When Ethernet data is encapsulated to GEM (that is, when the "Ethernet over GEM" mode is employed), each Ethernet frame is mapped into a GEM frame. As shown in FIG. 4, the GEM frame does not include the preamble and SFD, and the destination address, source address, length field, data field, and frame check sequence field of the Ethernet frame are directly mapped into the GEM payload for transmission. The GEM frame is automatically encapsulated with the GEM frame header which includes four parts: Payload Length Indicator (PLI, 12 bits), Port ID (12 bits), Payload Type Indicator (PTI, 3 bits), and Header Error Control (HEC, 13 bits). In case of Ethernet over GEM mode, the Ethernet time stamp generating point required for sending IEEE 1588/1588v2 clock packets is lost. As a result, the time synchronization method defined by IEEE 1588/1588v2 cannot be supported in "Ethernet over GEM" mode.

SUMMARY

One embodiment, the present invention comprises a method for synchronizing time in a Gigabit Passive Optical Network (GPON), comprising: sending, by an Optical Line Terminal (OLT), a downstream frame including a Physical Control Block downstream (PCBd) field and a payload field to an Optical Network Unit (ONU); determining, by the OLT, a time value associated with a certain bit in the PCBd field of the downstream frame; and sending, by the OLT, an Operation, Administration and Maintenance (OAM) message defined by a GPON protocol carrying the time value to the ONU, wherein the time value is used by the ONU to adjust a local time of the ONU.

Another embodiment of the present invention comprises a method for synchronizing time in a Gigabit Passive Optical Network (GPON), comprising: receiving, by an Optical Network Unit (ONU), a downstream frame including a Physical Control Block downstream (PCBd) field and a payload field from an Optical Line Terminal (OLT); acquiring, by the ONU, a time value associated with a certain bit in the PCBd field of the downstream frame from the OLT via an Operation, Administration and Maintenance (OAM) message defined by a GPON protocol; and adjusting a local time of the ONU based on the time value.

Yet another embodiment of the invention comprises an optical network device, comprising: a processing unit; and a sending unit coupled to the processing unit, wherein the processing unit and sending unit are jointly configured to: send a downstream frame including a Physical Control Block downstream (PCBd) field and a payload field to an Optical Network Unit (ONU); determine a time value associated with a certain bit in the PCBd field of the downstream frame; and send an Operation, Administration and Maintenance (OAM) message defined by a GPON protocol carrying the time value to the ONU, wherein the time value is used by the ONU to adjust a local time of the ONU.

A further embodiment of the invention comprises an optical network device, comprising: a receiving unit; and a processing unit coupled to the receiving unit, wherein the receiving unit and processing unit are jointly configured to: receive a downstream frame including a Physical Control Block downstream (PCBd) field and a payload field from an Optical Line Terminal (OLT); acquire a time value associated with a certain bit in the PCBd field of the downstream frame from the OLT via an Operation, Administration and Maintenance (OAM) message defined by a GPON protocol; and adjust a local time of the ONU based on the time value.

Some embodiments of the present invention enable multiple modes of clock packet encapsulation based on the PON transmission frame, for example, the application of IEEE 1588 in "Ethernet over GEM" mode. In this manner, time is synchronized in the network.

DETAILED DESCRIPTION

To better explain the technical solution of the present invention, some embodiments of the present invention are described hereinafter in detail with reference to the accompanying drawings.

Figure 1:
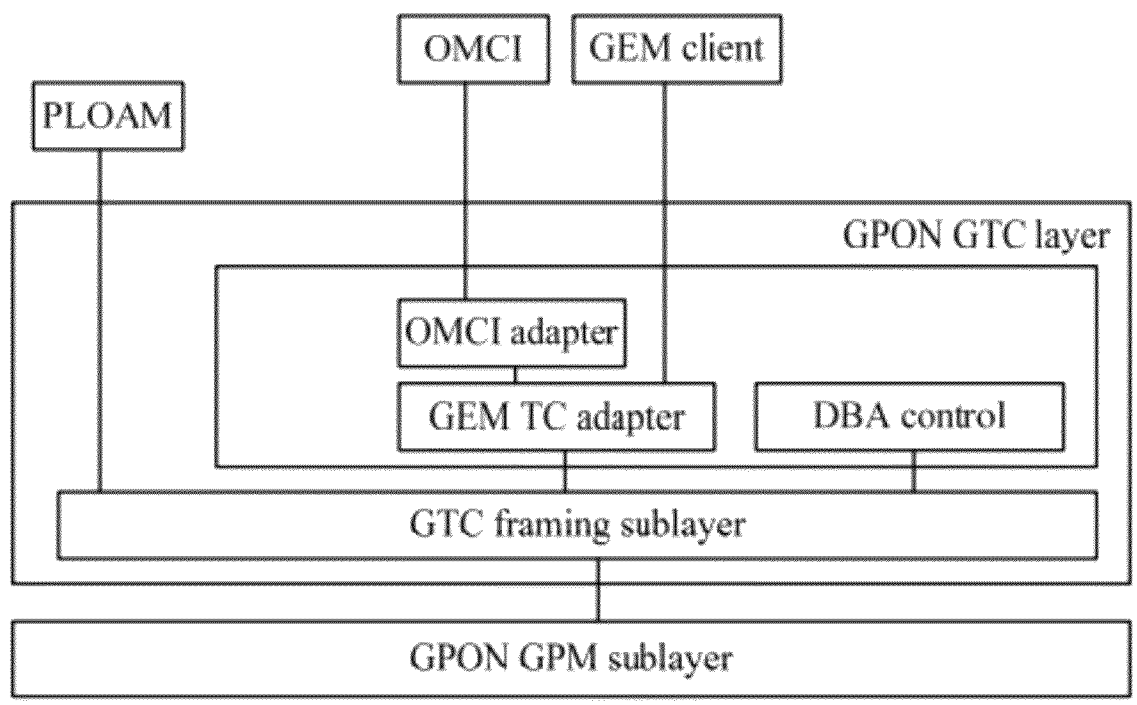
FIG. 1 is a schematic diagram illustrating a GPON protocol layered model in the prior art.
Figure 2A:
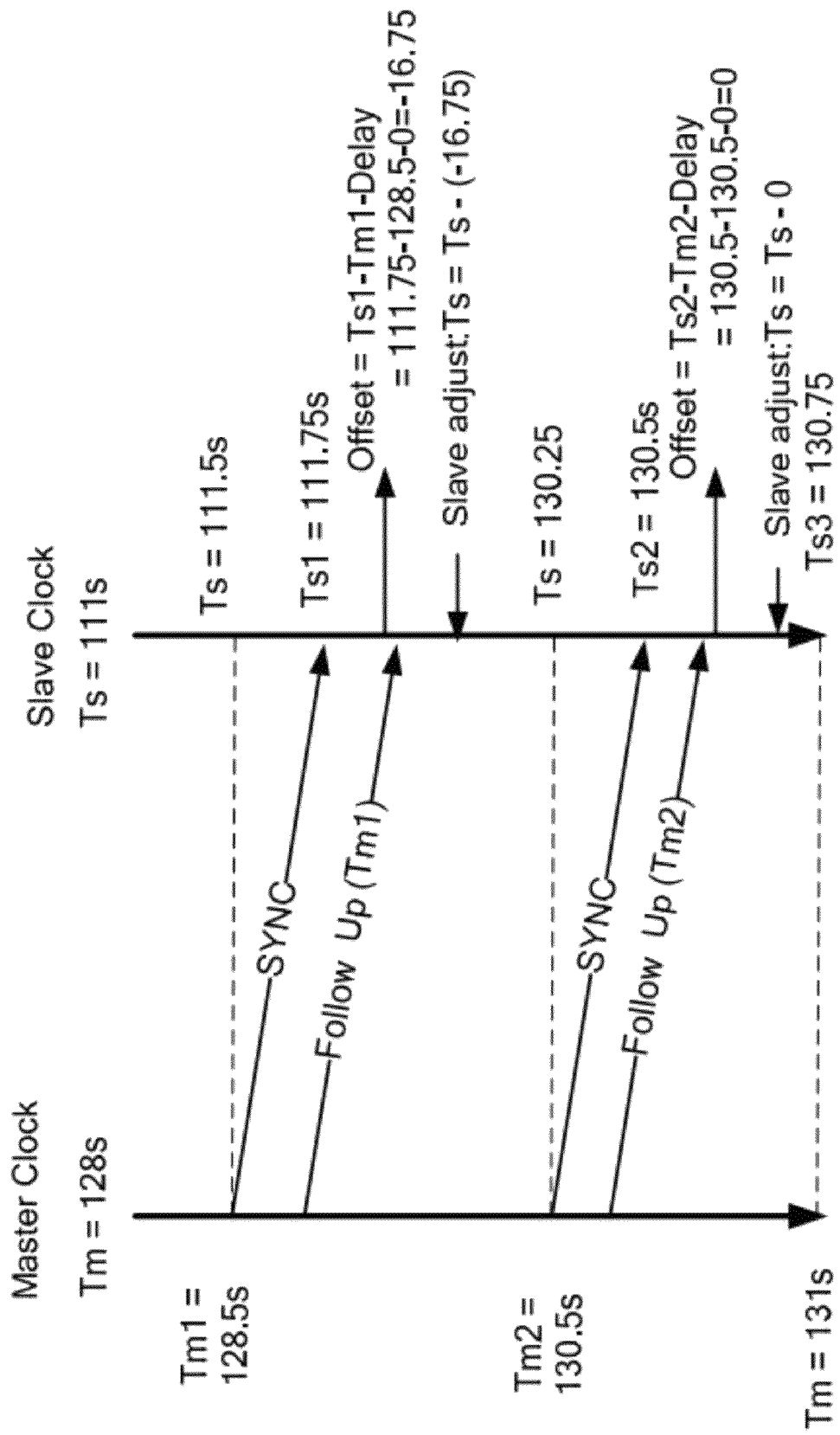
FIG. 2A is a schematic diagram illustrating the principle at the first-stage of the IEEE 1588 PTP protocol in the prior art.
Figure 2B:
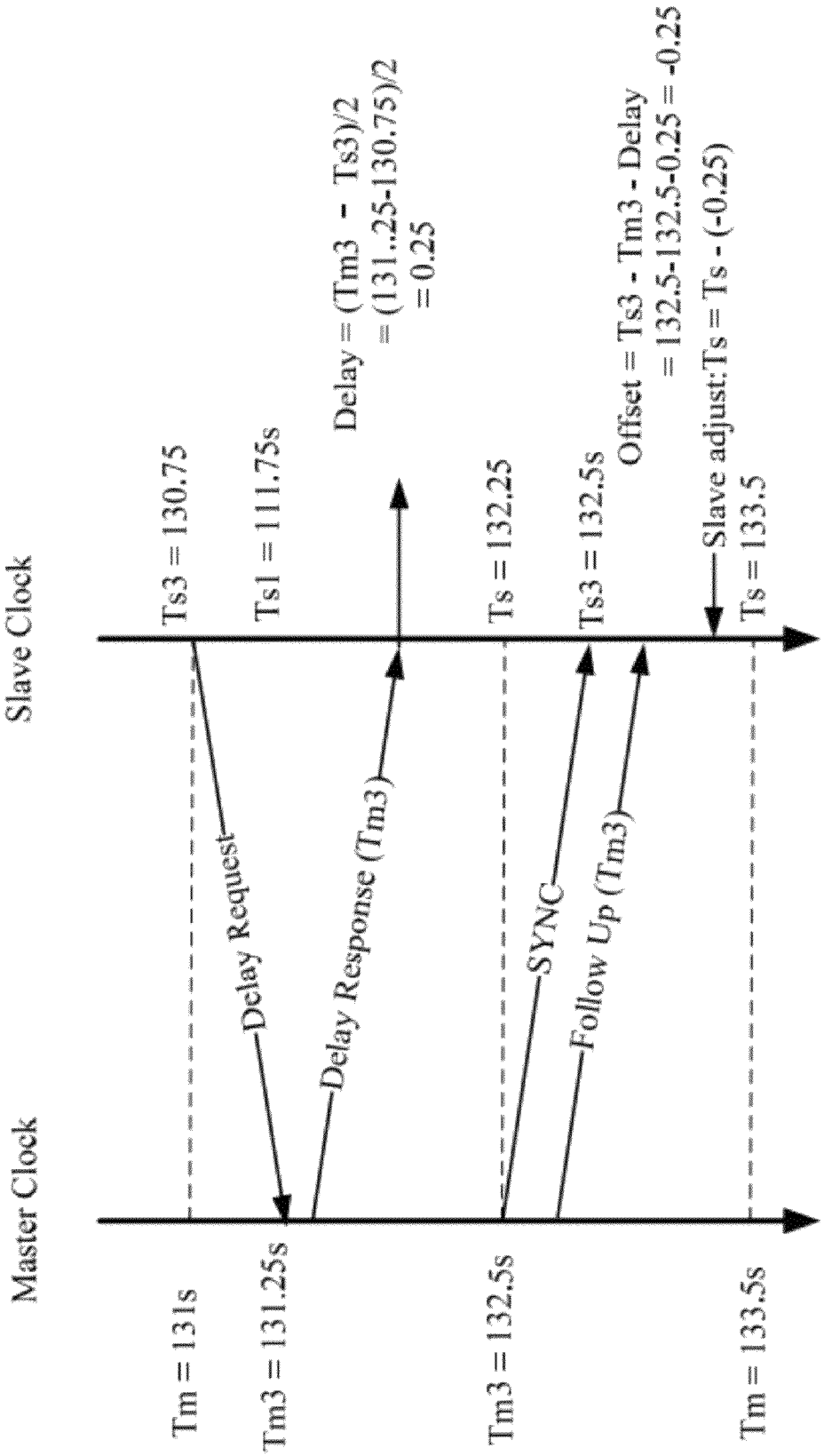
FIG. 2B is a schematic diagram illustrating the principle at the second-stage of the IEEE 1588 PTP protocol in the prior art.
Figure 3:
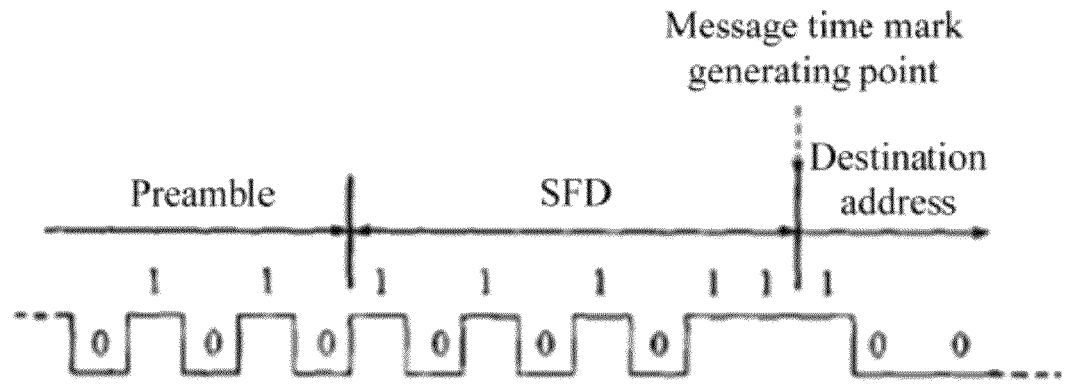
FIG. 3 is a schematic diagram illustrating a packet time stamp generating point in Ethernet in the prior art.
Figure 4:
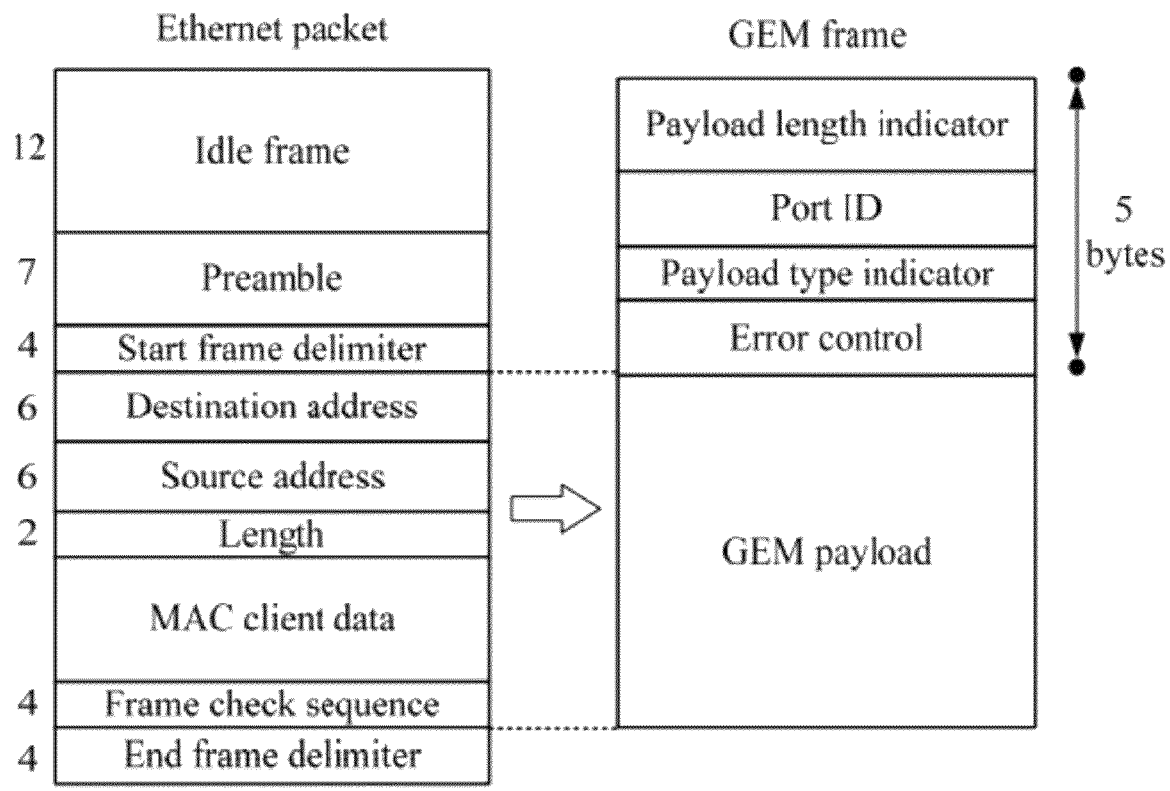
FIG. 4 is a schematic diagram illustrating "Ethernet over GEM" in the prior art.
Figure 5:
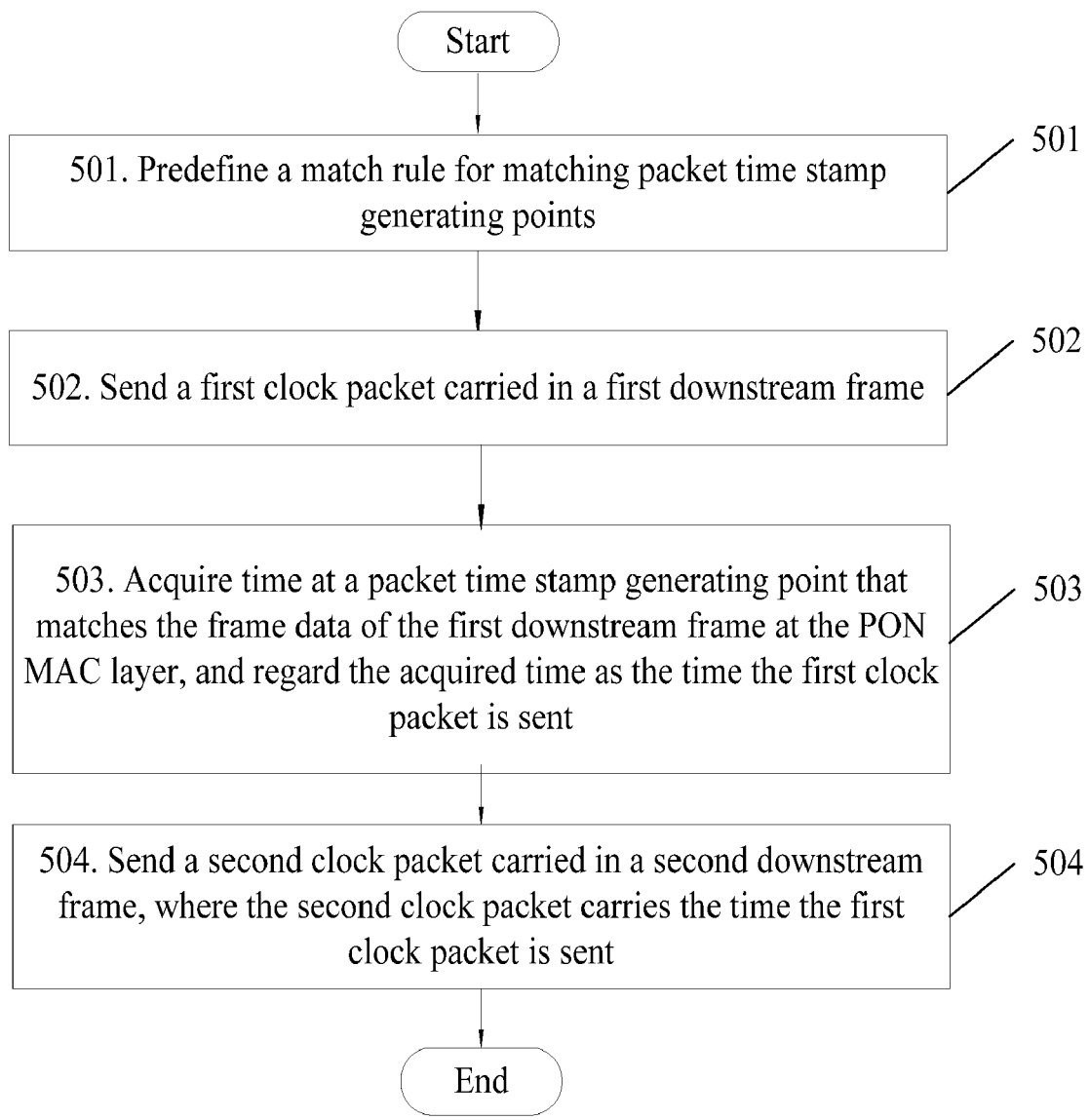
FIG. 5 is a flowchart of a method for synchronizing time of a master clock according to a first embodiment of the present invention.

As shown in FIG. 5, a method for synchronizing time at a master clock side according to an embodiment of the present invention includes the following steps:

501. A match rule is predefined for matching packet time stamp generating points.

502. An OLT sends a first clock packet carried in a first downstream frame. The first clock packet may be a sync message or a Delay Response message.

503. The OLT measures or acquires time at the packet time stamp generating point that matches the frame data of the first downstream frame at the PON MAC layer, where the acquired time is regarded as the time the first clock packet is sent.

504. The OLT sends a second clock packet carried in a second downstream frame, where the second clock packet contains the time the first clock packet is sent.

The second clock packet is a follow-up message.

In the method for synchronizing time at a master clock side according to the embodiment of the present invention, the time a clock packet is sent is first acquired at the packet time stamp generating point, which is determined according to the lower layer transmission frame. Therefore, the method enables multiple modes of clock packet encapsulation based on the PON transmission frame, for example, the application of IEEE 1588 in case of Ethernet over GEM. Thus, time is synchronized in the network.

Figure 6:
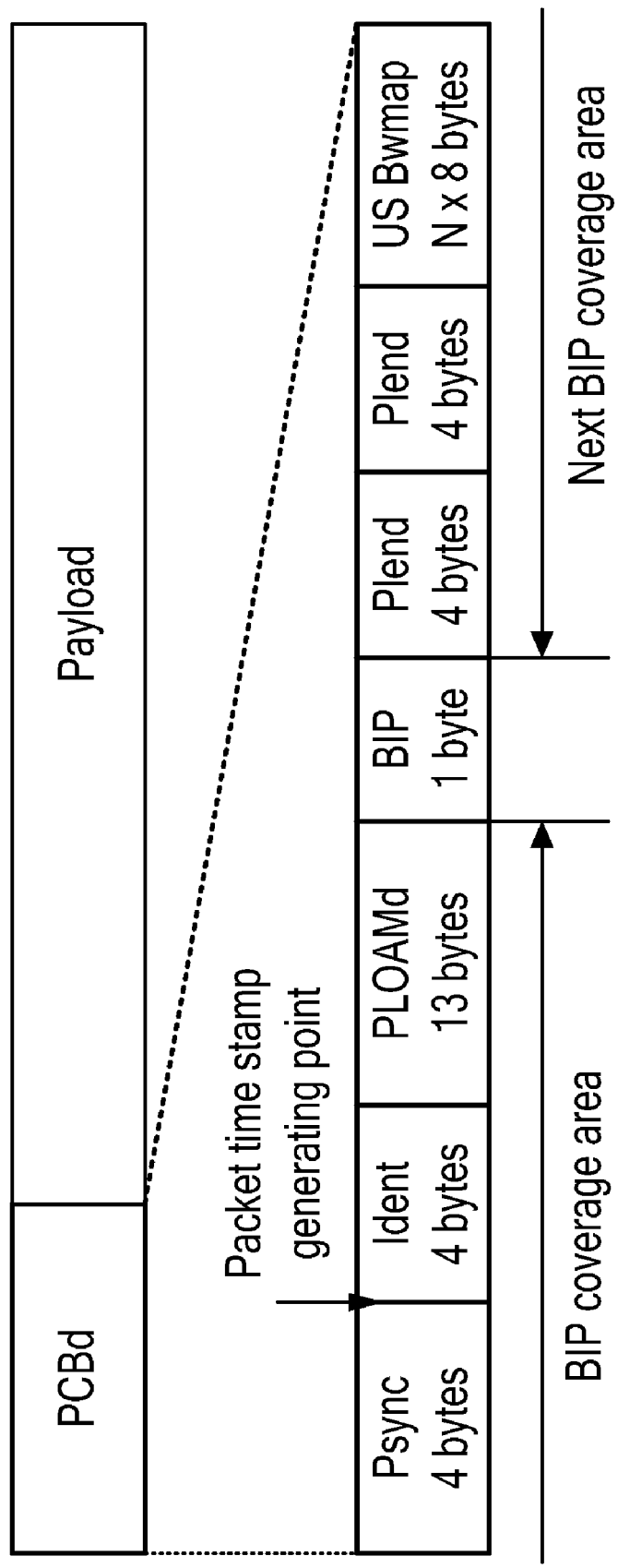
FIG. 6 is a schematic diagram illustrating a first time stamp generating point in a method for synchronizing time of a master clock according to an embodiment of the present invention.

In the method, the step of acquiring the time at the packet time stamp generating point that matches the frame data of the first downstream frame at the PON MAC layer, regarding the acquired time as the time the first clock packet is sent includes: regarding the last bit of the physical synchronization (Psync) field in the frame header of the GTC TC frame of the first downstream frame at the GTC framing sub-layer as the packet time stamp generating point. As shown in FIG. 6, the downstream frame structure of the GTC TC frame includes a frame header and a payload. Physical Control Block downstream (PCBd) is the downstream frame header of the GTC TC frame. The packet time stamp generating point is located at the last bit of the Psync field in the GTC TC frame header.

Figure 7:
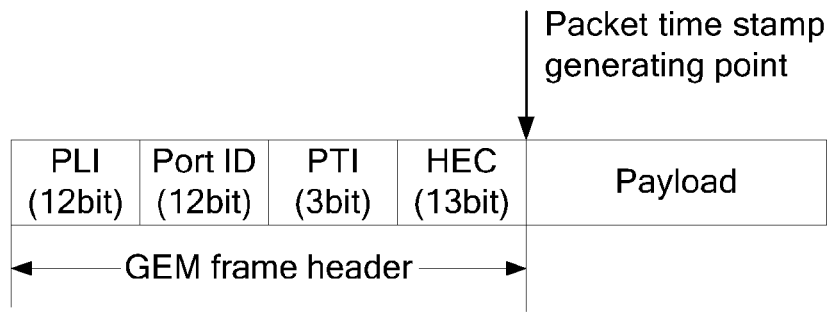
FIG. 7 is a schematic diagram illustrating a second time stamp generating point in a method for synchronizing time of a master clock according to an embodiment of the present invention.

Optionally, the step of acquiring the time at the packet time stamp generating point that matches the frame data of the first downstream frame at the PON MAC layer and regarding the acquired time as the time the first clock packet is sent includes: regarding the last bit of the HEC field in the frame header of the GEM frame of the first downstream frame at the TC adapter sub-layer as the packet time stamp generating point. As shown in FIG. 7, the GEM frame includes a frame header and a payload. The packet time stamp generating point is determined according to the GEM frame header. For example, the packet time stamp generating point is located at the last bit of the HEC field in the GEM frame header.

Figure 8:
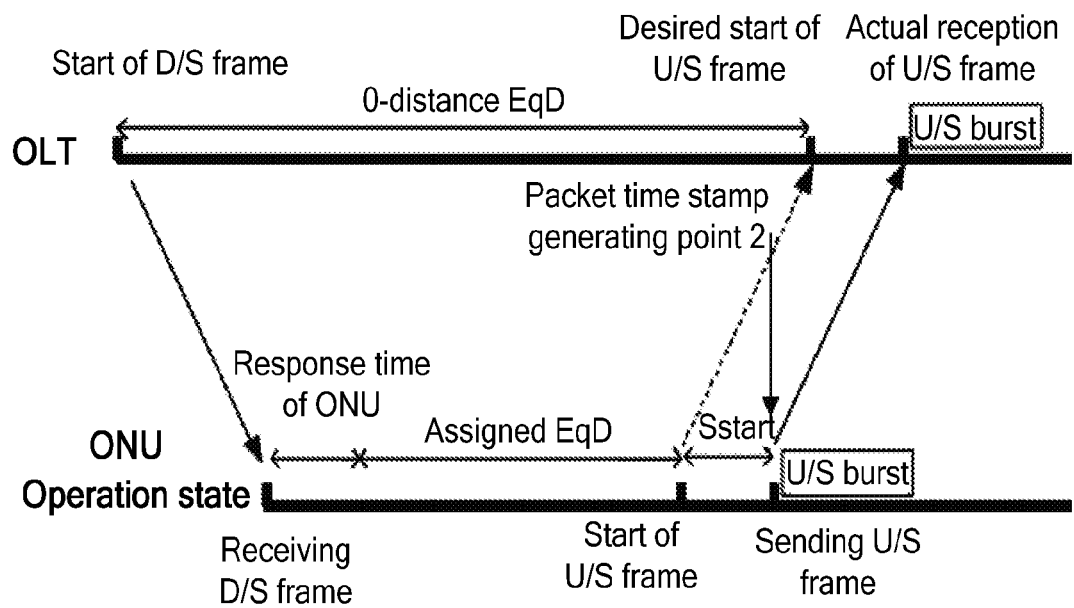
FIG. 8 is a schematic diagram illustrating a third time stamp generating point in a method for synchronizing time of a master clock according to an embodiment of the present invention, where the ONU is in the Working state.
Figure 9:
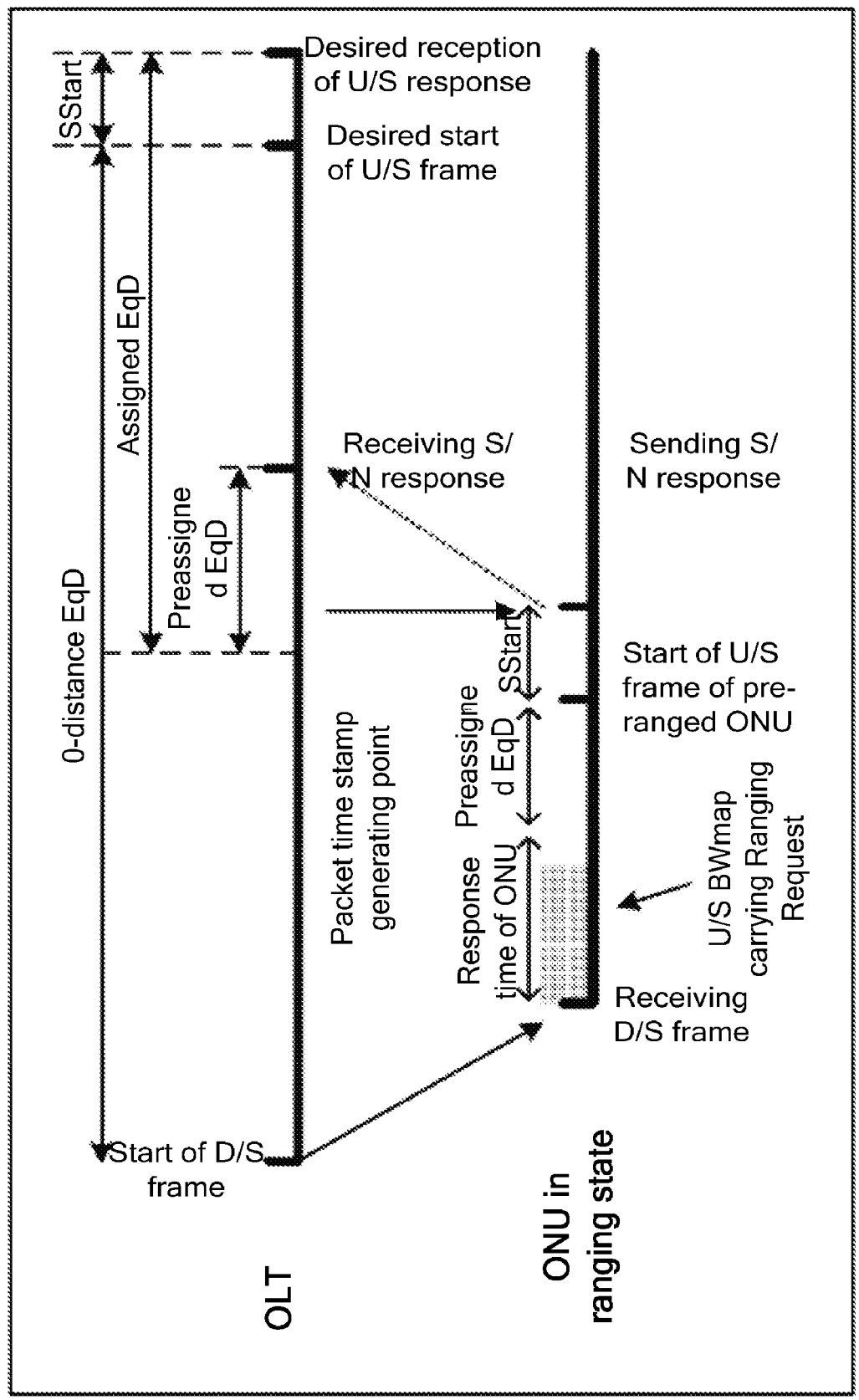
FIG. 9 is a schematic diagram illustrating a fourth time stamp generating point in a method for synchronizing time of a master clock according to an embodiment of the present invention, where the ONU is in the Ranging state.

Optionally, the step of acquiring the time at the packet time stamp generating point that matches the frame data of the first downstream frame at the PON MAC layer and regarding the acquired time as the time the first clock packet is sent includes: determining the packet time stamp generating point according to the sum of the start time received by the ONU, the response time of the ONU, and the Equal Delay (EqD) of the ONU. The above basis for determining the packet time stamp generating point may be included in the first downstream frame or needs be added to the first downstream frame. For example, the OLT sends a bandwidth map (BWmap) message to the ONU. The BWmap message is used to allocate for each ONU a transmission interval that indicates the ONU to transmit upstream data therein. The StartTime (Sstart) field in the BWmap message includes a time indicator. As shown in FIG. 8 and FIG. 9, the packet time stamp generating point is determined according to the sum of the start time indicated by the Sstart field in the BWmap message received by the ONU, the response time of the ONU, and the EqD. The response time of the ONU is a performance index of the ONU and is dependent on the hardware configuration of the ONU. The EqD is dependent on the network delay.

Figure 10:
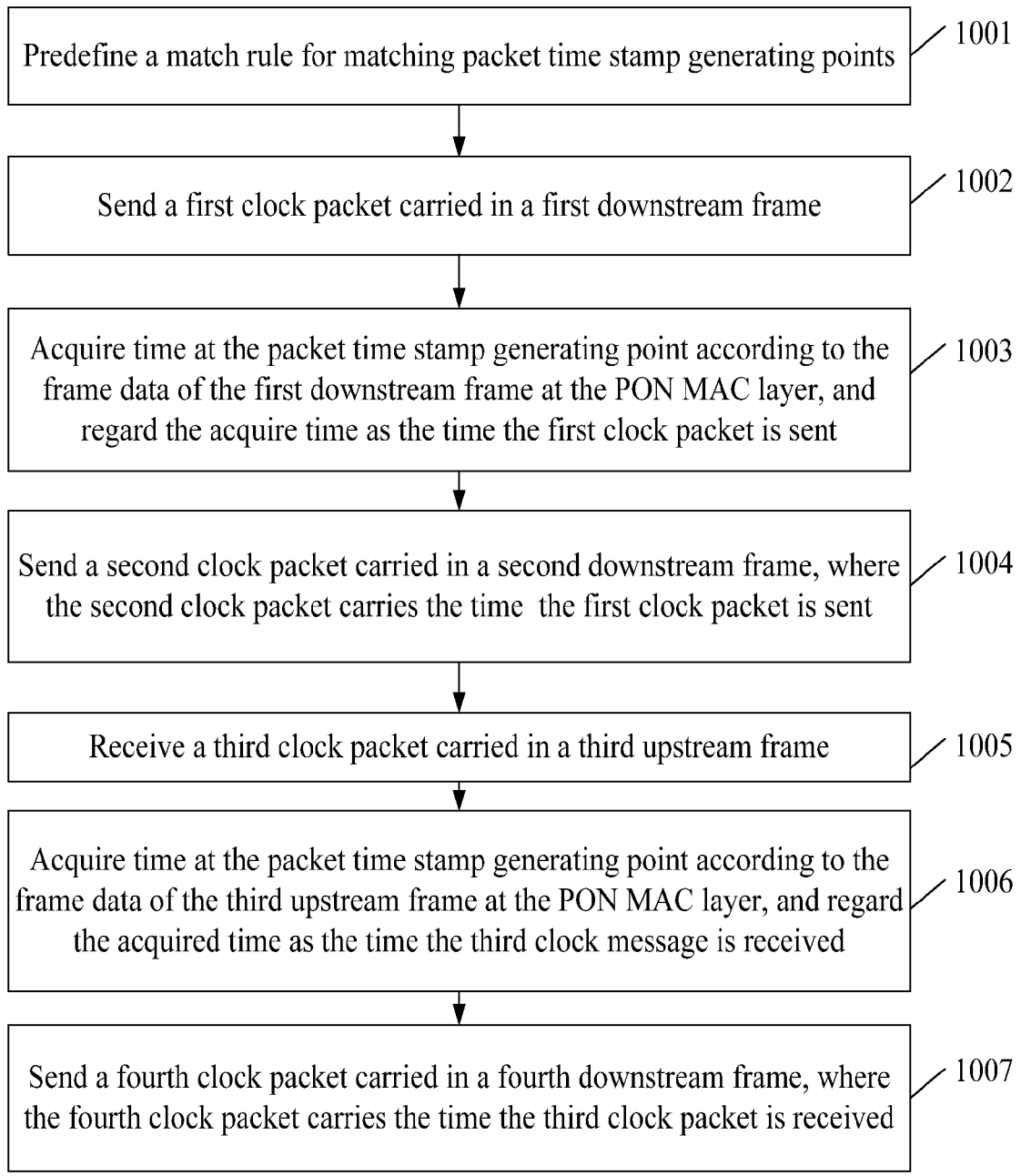
FIG. 10 is a flowchart of a method for synchronizing time of a master clock according to a second embodiment of the present invention.

As shown in FIG. 10, a method for synchronizing time at a master clock side provided in an embodiment of the present invention includes the following steps:

1001. A match rule is predefined for matching packet time stamp generating points.

1002. The OLT sends a first clock packet carried in a first downstream frame.

The first clock packet may be a sync message or a Delay Response message.

1003. The OLT acquires time at the packet time stamp generating point according to the frame data of the first downstream frame at the PON MAC layer, where the acquired time is regarded as the time the first clock packet is sent.

1004. The OLT sends a second clock packet which carries the time the first clock packet is sent. The second clock packet is a follow-up message and is carried in a second downstream frame.

1005. The OLT receives a third clock packet carried in a third upstream frame. The third clock packet may be a Delay Request message.

1006. The OLT acquires time at the packet time stamp generating point according to the frame data of the third upstream frame at the PON MAC layer, and the acquired time is regarded as the time the OLT receives the third clock packet.

1007. The OLT sends a fourth clock packet, where the fourth clock packet carries the time the third clock packet is received and the fourth clock packet is carried in a fourth downstream frame.

The fourth clock packet is a Delay Response message.

Figure 11:
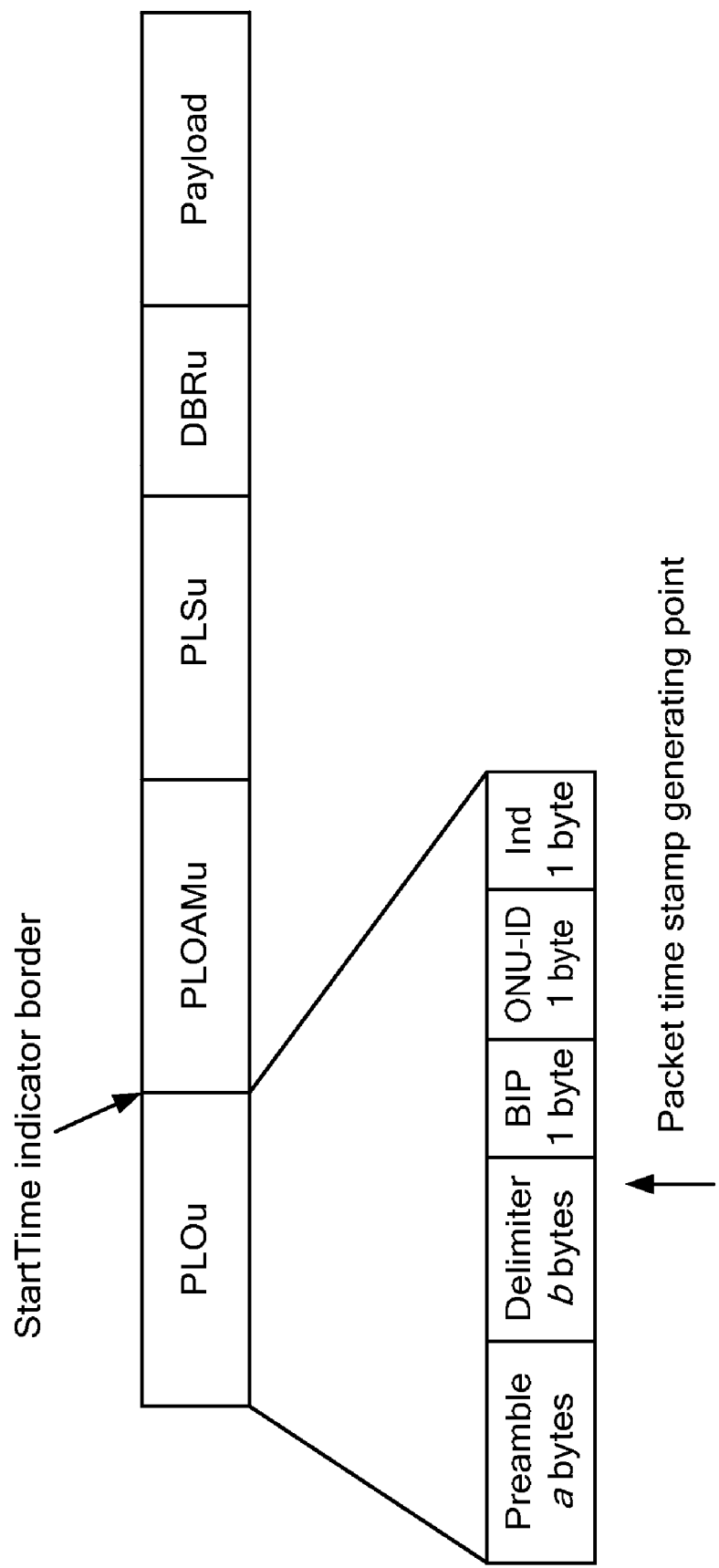
FIG. 11 is a schematic diagram illustrating a fifth time stamp generating point in a method for synchronizing time of a master clock according to an embodiment of the present invention.

In the method, the step of acquiring the time at the packet time stamp generating point according to the frame data of the third upstream frame at the PON MAC layer and regarding the acquired time as the time the third clock packet is received includes: regarding the last bit of the Delimiter field in the frame header of the GTC TC frame of the third upstream frame at the GTC framing sub-layer as the packet time stamp generating point. As shown in FIG. 11, the GTC TC frame includes a frame header and a payload. In the upstream direction, that is, when the synchronization clock packet is sent from the ONU to the OLT, the packet time stamp generating point is located at the last bit of the Delimiter field in the GTC TC frame.

Optionally, the step of acquiring the time at the packet time stamp generating point according to the frame data of the third upstream frame at the PON MAC layer and regarding the acquired time as the time the third clock packet is received includes: regarding the last bit of the HEC field in the frame header of the GEM frame of the third upstream frame at the TC adapter sub-layer as the packet time stamp generating point, as shown in FIG. 7.

Optionally, the step of acquiring the time at the packet time stamp generating point according to the frame data of the third upstream frame at the PON MAC layer and regarding the acquired time as the time the third clock packet is received includes: regarding the last bit of the HEC field in the frame header of the GEM frame of the third upstream frame at the TC adapter sub-layer as the packet time stamp generating point. As shown in FIG. 11, the GTC TC frame includes a frame header and a payload. The Physical Layer Overhead upstream (PLOu) is the upstream frame header of the GTC TC frame. The payload is the upstream frame payload of the GTC TC frame. The last bit of the PLOu in the GTC TC frame header is regarded as the packet time stamp generating point.

The first, second, third, and fourth clock packets are carried over Ethernet protocols such as ETH, Internet Protocol (IP), and User Datagram Protocol (UDP). Or, the first, second, third, and fourth clock packets are carried in IEEE 1588/1588v2 over GEM mode; or the first, second, third, and fourth clock packets are carried in PLOAM messages; or the first, second, third, and fourth clock packets are carried in OMCI messages.

Figure 12:
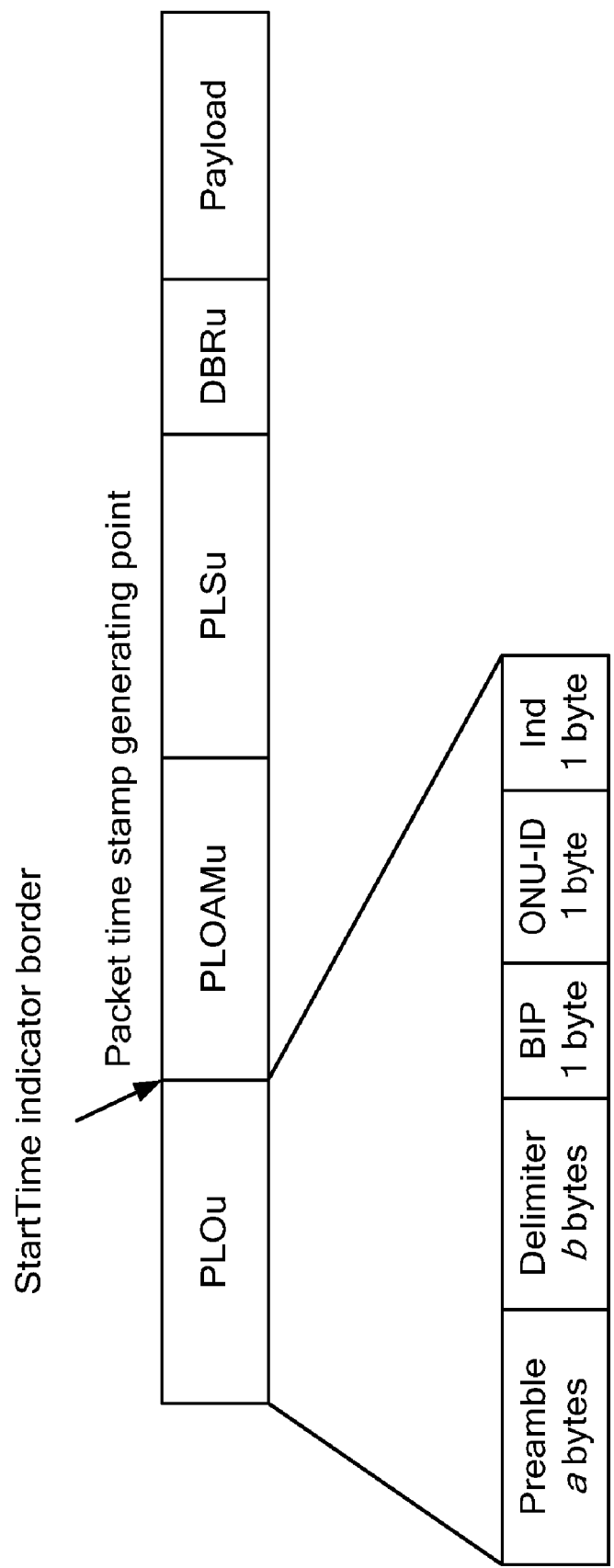
FIG. 12 is a schematic diagram illustrating a sixth time stamp generating point in a method for synchronizing time of a master clock according to an embodiment of the present invention.
Figure 13:
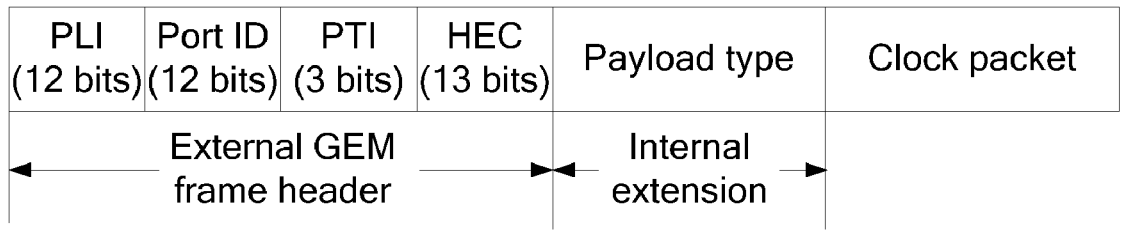
FIG. 13 is a schematic diagram illustrating a GEM frame structure in a method for synchronizing time of a master clock according to an embodiment of the present invention.

In case of IEEE 1588/1588v2 over GEM mode, the PTI in the GEM frame header may indicate that the frame includes an internal extended field, and the PTI in the extended field indicates that the service type of the payload is IEEE 1588/1588v2 clock packet. For example, as shown in the following table, when the PTI code is 110, it indicates that an internal GEM frame extended field is carried. FIG. 12 illustrates the structure of a GEM frame when the PTI code is 110.

| PTI Code | Function |
| --- | --- |
| 000-101 | Same as in the prior art, indicates whether the GEM frame is the last section in case of sectional processing or whether congestion occurs. |
| 110 | Indicates that an internal GEM frame extended field is carried. |

Those skilled in the art can understand that the mode of transmitting and/or receiving clock packets here is also applicable to other embodiments of the present invention.

On the other hand, an embodiment of the present invention provides a method for synchronizing time of a slave clock.

Figure 14:
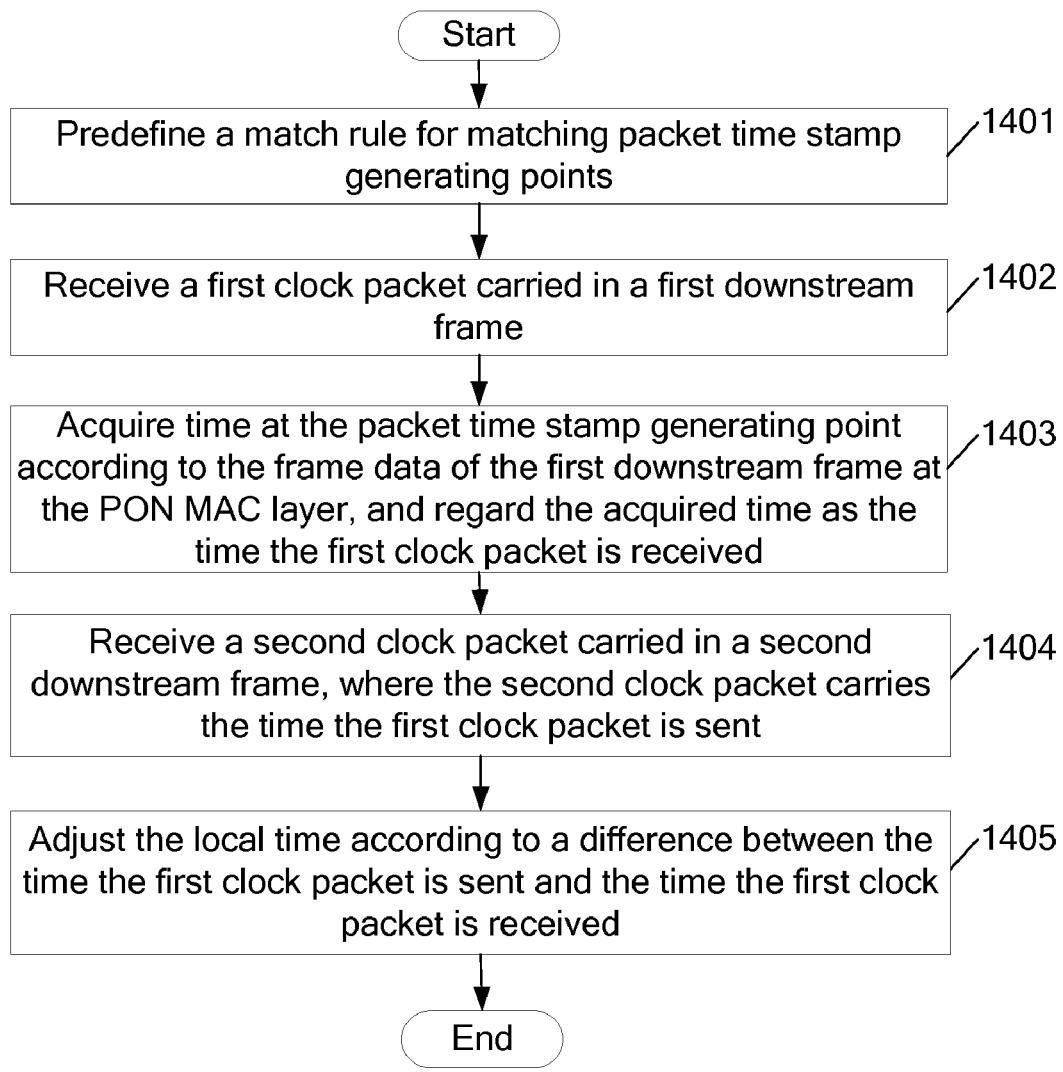
FIG. 14 is a flowchart of a method for synchronizing time of a slave clock according to a first embodiment of the present invention.

As shown in FIG. 14, the method for synchronizing time at a slave clock side includes:

1401. A match rule is predefined for matching packet time stamp generating points.

1402. The ONU receives a first clock packet from the OLT. The first clock packet is carried in a first downstream frame. The first clock packet may be a sync message or a Delay Response message.

1403. The ONU acquires time at the packet time stamp generating point according to the frame data of the first downstream frame at the PON MAC layer and regards the acquired time as the time the ONU receives the first clock packet.

1404. The ONU receives a second clock packet, where the second clock packet carries the time the first clock packet is sent and the second clock packet is carried in a second downstream frame.

The second clock packet is a follow-up message.

1405. The ONU adjusts the local time according to a difference between the time the OLT sends the first clock packet and the time the ONU receives the first clock packet.

In the slave clock time synchronization method according to the embodiment of the present invention, a packet time stamp generating point is first determined based on the lower layer and then the time a clock packet is sent and/or received on the slave clock side is determined according to the packet time stamp generating point. Therefore, the method enables multiple modes of clock packet encapsulation based on the PON transmission frame, for example, the application of IEEE 1588 in case of Ethernet over GEM mode. Thus, time is synchronized in the network.

In the method, the step of acquiring the time at the packet time stamp generating point according to the frame data of the first downstream frame at the PON MAC layer and regarding the acquired time as the time the ONU receives the first clock packet includes: regarding the last bit of the Psync field in the frame header of the GTC TC frame of the first downstream frame at the GTC framing sub-layer as the packet time stamp generating point, as shown in FIG. 6.

Optionally, the step of acquiring the time at the packet time stamp generating point according to the frame data of the first downstream frame at the PON MAC layer and regarding the acquired time as the time the ONU receives the first clock packet includes: regarding the last bit of the HEC field in the frame header of the GEM frame of the first downstream frame at the TC adapter sub-layer as the packet time stamp generating point, as shown in FIG. 7.

Optionally, the step of acquiring the time at the packet time stamp generating point according to the frame data of the first downstream frame at the PON MAC layer and regarding the acquired time as the time the ONU receives the first clock packet includes: determining the packet time stamp generating point according to the sum of the start time received by the ONU, the response time of the ONU, and the EqD of the ONU, as shown in FIG. 8 and FIG. 9.

Figure 15:
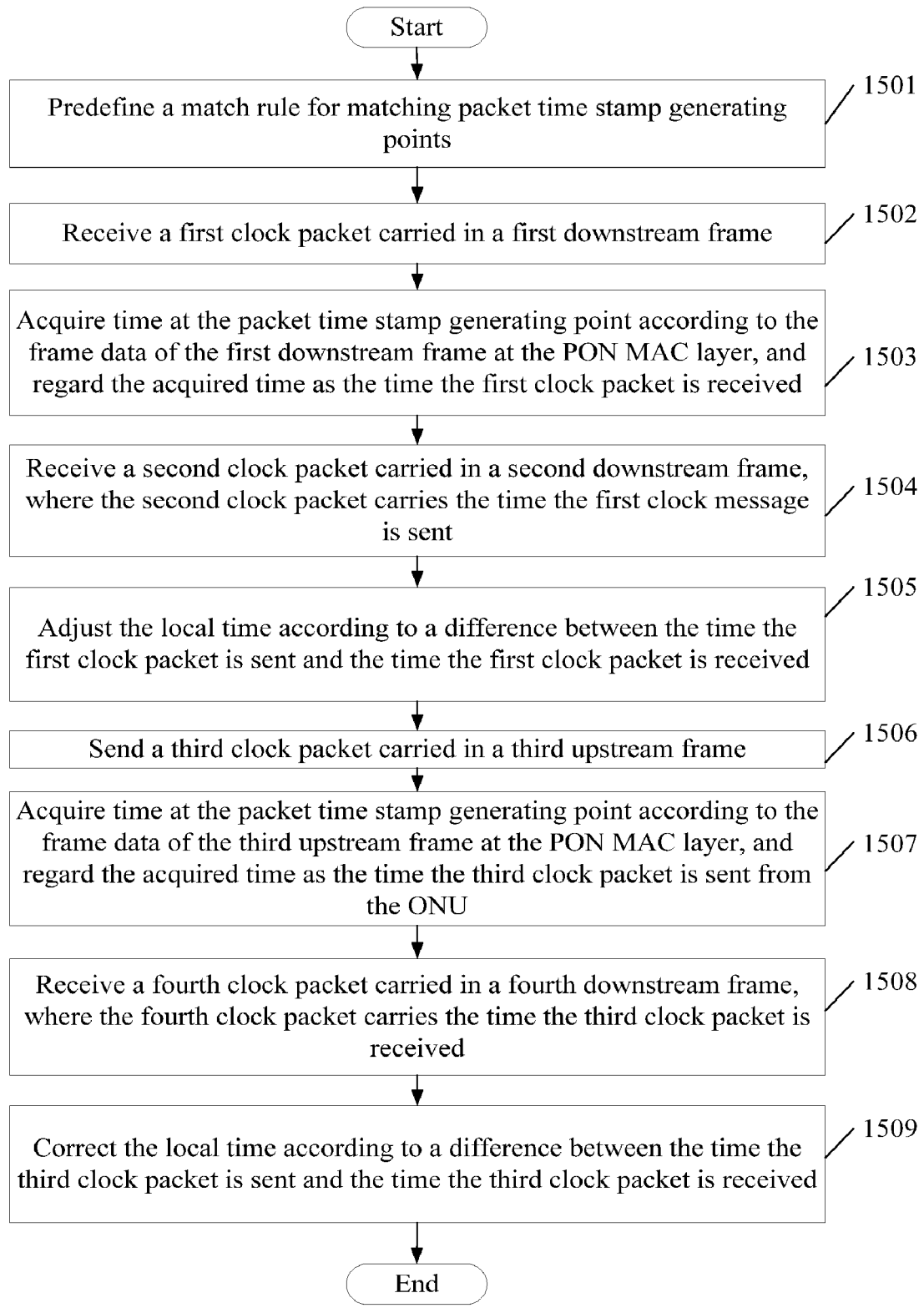
FIG. 15 is a flowchart of a method for synchronizing time of a slave clock according to a second embodiment of the present invention.

As shown in FIG. 15, a method for synchronizing time at a slave clock side in an embodiment of the present invention includes:

1501. A match rule is predefined for matching packet time stamp generating points.

1502. The ONU receives a first clock packet from the OLT. The first clock packet is carried in a first downstream frame.

1503. The ONU acquires time at the packet time stamp generating point according to the frame data of the first downstream frame at the PON MAC layer and regards the acquired time as the time the ONU receives the first clock packet.

1504. The ONU receives a second clock packet from the OLT. The second clock packet carries the time the OLT sends the first clock packet.

1505. The ONU adjusts the local time according to a difference between the time the OLT sends the first clock packet and the time the ONU receives the first clock packet.

1506. The ONU sends a third clock packet to the OLT.

1507. The ONU acquires time at the packet time stamp generating point according to the frame data of the third upstream frame at the PON MAC layer and regards the acquired time as the time the ONU sends the third clock packet.

1508. The ONU receives a fourth clock packet from the OLT. The fourth clock packet carries the time the OLT receives the third clock packet.

1509. The ONU corrects the local time according to a difference between the time the ONU sends the third clock packet and the time the OLT receives the third clock packet.

In the method, the step of acquiring the time at the packet time stamp generating point according to the frame data of the third upstream frame at the PON MAC layer and regarding the acquired time as the time the third clock packet is sent includes: regarding the last bit of the Delimiter field in the frame header of the GTC TC frame of the third upstream frame at the GTC framing sub-layer as the packet time stamp generating point, as shown in FIG. 11.

Optionally, the step of acquiring the time at the packet time stamp generating point according to the frame data of the third upstream frame at the PON MAC layer and regarding the acquired time as the time the third clock packet is sent includes: regarding the last bit of the HEC field in the frame header of the GEM frame of the third upstream frame at the TC adapter sub-layer as the packet time stamp generating point, as shown in FIG. 7.

Optionally, the step of acquiring the time at the packet time stamp generating point according to the frame data of the third upstream frame at the PON MAC layer and regarding the acquired time as the time the third clock packet is sent includes: regarding the last bit of the PLOu field in the frame header of the GTC TC frame of the third upstream frame at the GTC framing sub-layer as the packet time stamp generating point, as shown in FIG. 12.

In the embodiment of the present invention, the packet time stamp generating point is determined at the lower layer (GTC framing sub-layer or TC adapter sub-layer) of the PON and thus the precision and accuracy of the generated time stamp are improved.

The first, second, third, and fourth clock packets are carried over an Ethernet protocol; or in IEEE 1588/1588v2 over GEM mode; or in PLOAM messages; or in OMCI messages.

The first, second, third, and fourth clock packets are received when the ONU is in the Working state or Ranging state. The third clock packet is sent when the ONU is in the Working state or Ranging state. As shown in FIG. 8, the clock packets are sent and/or received when the ONU is in the Working state; or as shown in FIG. 9, the clock packets are sent and/or received when the ONU is in the Ranging state. The clock packets are not sent when the ONU is in the Serial Number state to avoid a great error in time synchronization caused by the random delay.

Those skilled in the art understand that all or part of the steps in the methods according to the above embodiments of the present invention can be completed by hardware under software instructions. The software according to the embodiments of the present invention can be stored in a computer-readable medium.

Another embodiment of the present invention provides an optical network device on the master clock side, namely, an OLT.

Figure 16:
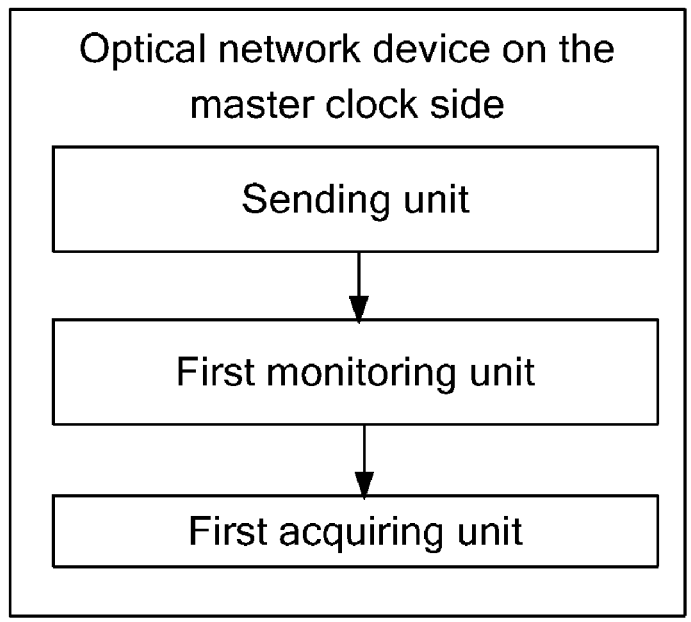
FIG. 16 illustrates a structure of an optical network device on the master clock side according to a first embodiment of the present invention.

As shown in FIG. 16, the optical network device on the master clock side includes:

a sending unit, configured to send a first clock packet carried in a first downstream frame and a second clock packet carried in a second downstream frame, where the second clock packet carries the time stamp when the OLT sends the first clock packet;

a first monitoring unit, configured to determine the packet time stamp generating point according to the frame data of the first downstream frame at the PON MAC layer; and a first acquiring unit, configured to acquire time at the packet time stamp generating point and regard the acquired time as the time the OLT sends the first clock packet.

The optical network device on the master clock side according to the embodiment of the present invention monitors the packet time stamp generating point based on the lower layer and acquires the time the clock packet is sent on the master clock side at the packet time stamp generating point. Therefore, the optical network device on the master clock side is able to support IEEE 1588/188v2 time synchronization in Ethernet over GEM mode and thus realizes time synchronization in the network.

The first monitoring unit is also configured to:

regard the last bit of the Psync field in the frame header of the GTC TC frame of the first downstream frame at the GTC framing sub-layer as being the packet time stamp generating point; or regard the last bit of the HEC field in the frame header of the GEM frame of the first downstream frame at the TC adapter sub-layer as being the packet time stamp generating point; or determine the packet time stamp generating point according to the sum of the start time received by the ONU, the response time of the ONU, and the EqD of the ONU.

Figure 17:
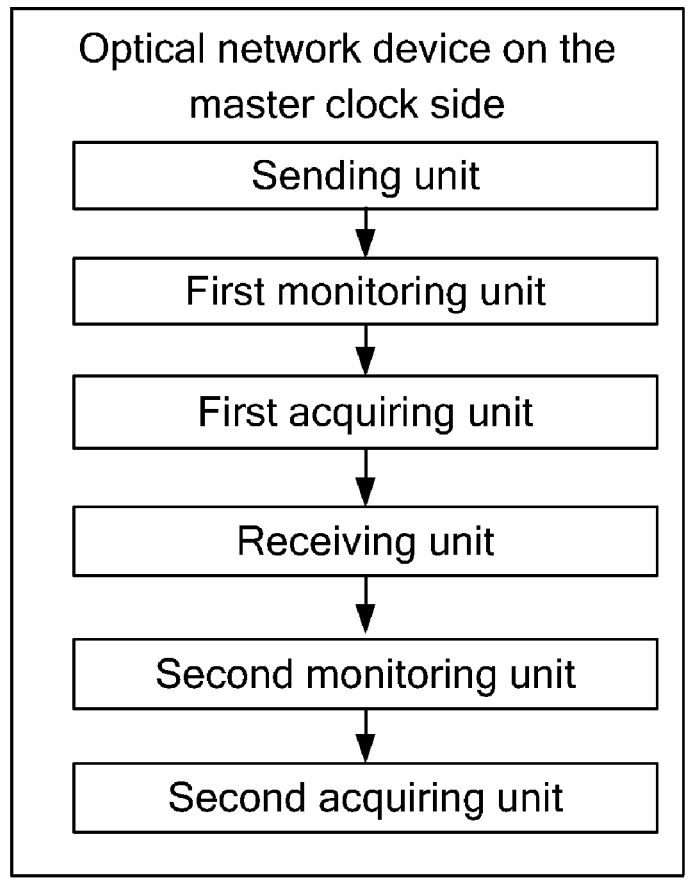
FIG. 17 illustrates a structure of an optical network device on the master clock side according to a second embodiment of the present invention.

As shown in FIG. 17, the optical network device on the master clock side according to the embodiment of the present invention further includes:

a receiving unit, configured to receive a third clock packet carried in a third upstream frame;

a second monitoring unit, configured to determine the packet time stamp generating point according to the frame data of the third upstream frame at the PON MAC layer; and a second acquiring unit, configured to acquire time at the packet time stamp generating point and regard the acquired time as the time the OLT receives the third clock packet.

The sending unit is further configured to send a fourth clock packet of the OLT, where the fourth clock packet carries the time stamp when the OLT receives the third clock packet.

The second monitoring unit is also configured to:

regard the last bit of the Delimiter field in the frame header of the GTC TC frame of the third upstream frame at the GTC framing sub-layer as the packet time stamp generating point; or regard the last bit of the HEC field in the frame header of the GEM frame of the third upstream frame at the TC adapter sub-layer as the packet time stamp generating point; or regard the last bit of the PLOu field in the frame header of the GTC TC frame of the third upstream frame at the GTC framing sub-layer as the packet time stamp generating point.

In the embodiment of the present invention, the optical network device on the master clock side determines the time stamp generating point based on the lower layer (GTC framing sub-layer or TC adapter layer) of the PON, and thus the precision and accuracy of the generated time stamp are improved.

Figure 18:
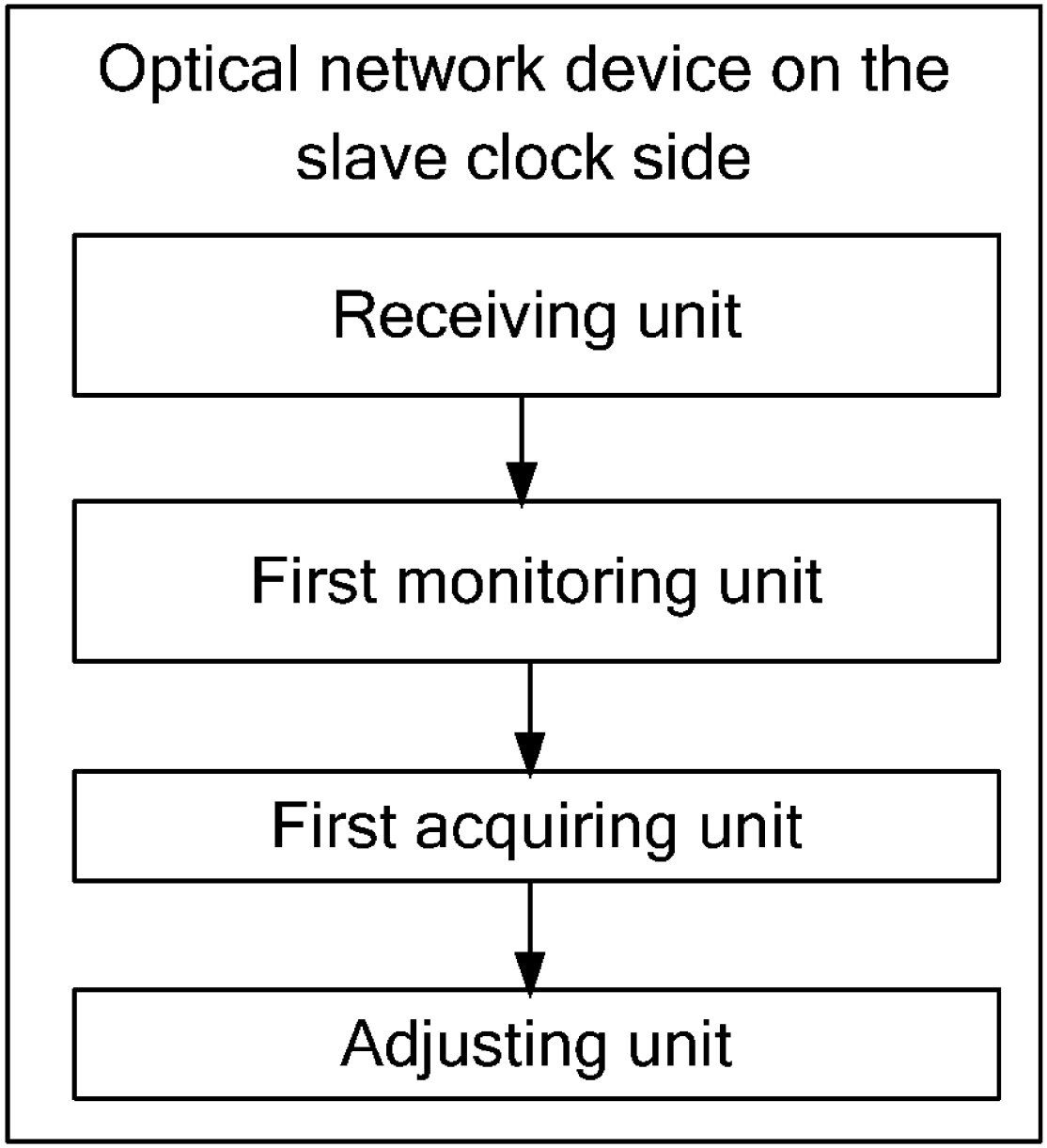
FIG. 18 illustrates a structure of an optical network device on the slave clock side according to a first embodiment of the present invention.

Another embodiment of the present invention provides an optical network device on the slave clock side, namely, an ONU. As shown in FIG. 18, the optical network device on the slave clock side includes:

a receiving unit, configured to receive a first clock packet and a second clock packet from the OLT, where the second clock packet carries the time stamp when the OLT sends the first clock packet;

a first monitoring unit, configured to determine the packet time stamp generating point according to the frame data of the first downstream frame at the PON MAC layer;

a first acquiring unit, configured to acquire time at the packet time stamp generating point, where the acquired time is regarded as the time the ONU receives the first clock packet; and an adjusting unit, configured to adjust the local time of the ONU according to a difference between the time the OLT sends the first clock packet and the time the ONU receives the first clock packet.

The first monitoring unit is also configured to:

regard the last bit of the Psync field in the frame header of the GTC TC frame of the first downstream frame at the GTC framing sub-layer as the packet time stamp generating point; or regard the last bit of the HEC field in the frame header of the GEM frame of the first downstream frame at the TC adapter sub-layer as the packet time stamp generating point; or determine the packet time stamp generating point according to the sum of the start time received by the ONU which is contained in the first downstream frame or needs to be added in the first downstream frame, the response time of the ONU, and the EqD of the ONU.

Figure 19:
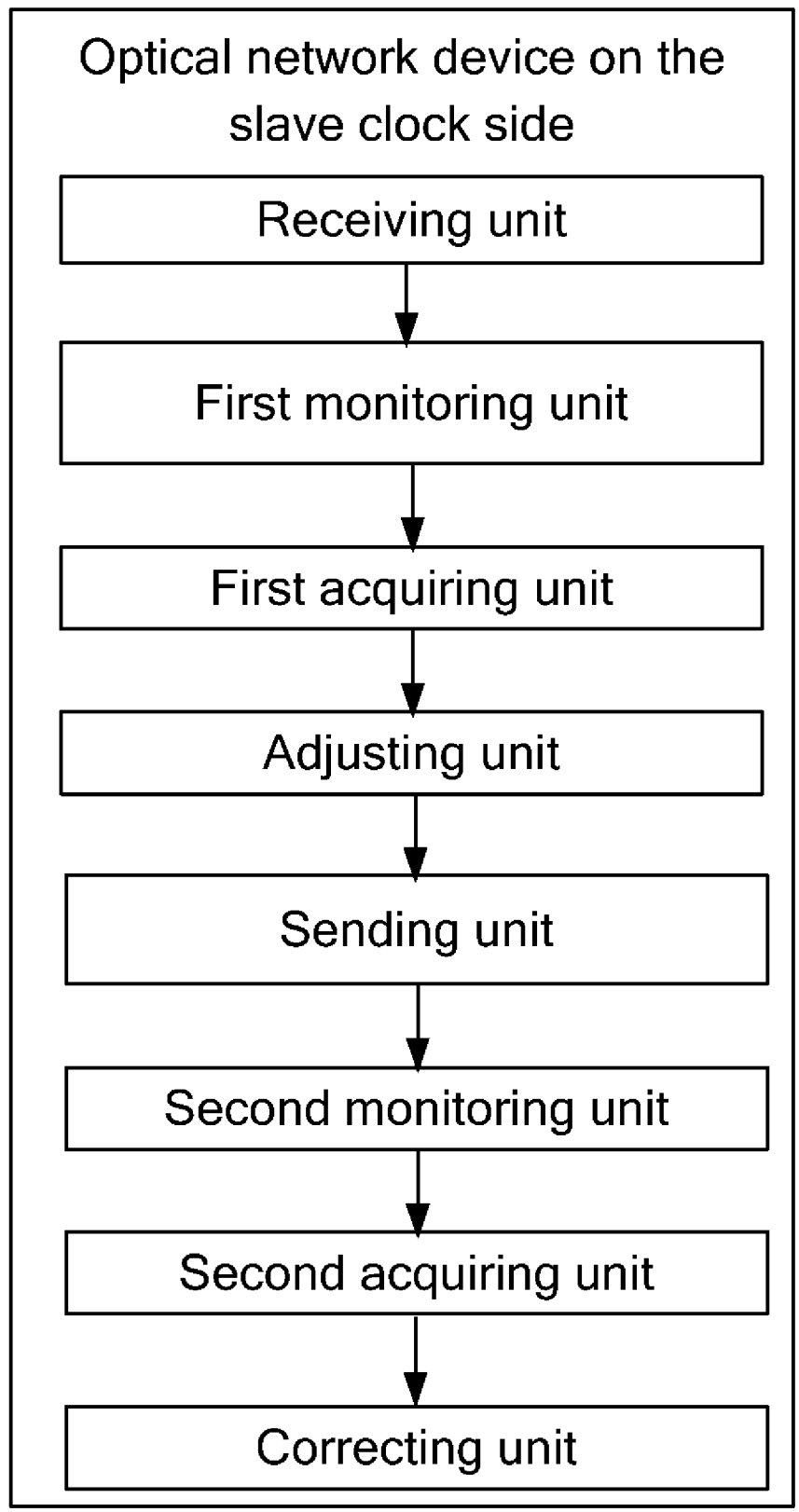
FIG. 19 illustrates a structure of an optical network device on the slave clock side according to a second embodiment of the present invention.

As shown in FIG. 19, the optical network device on the slave clock side further includes:

a sending unit, configured to send a third clock packet carried in a third upstream frame;

a second monitoring unit, configured to determine the packet time stamp generating point according to the frame data of the third upstream frame at the PON MAC layer;

a second acquiring unit, configured to acquire time at the packet time stamp generating point and regard the acquired time as the time the ONU sends the third clock packet; and a correcting unit, configured to correct the local time of the ONU according to a difference between the time the ONU sends the third clock packet and the time the OLT receives the third clock packet.

The receiving unit is further configured to receive from the OLT a fourth clock packet carried in a fourth downstream frame, where the fourth clock packet carries the time stamp when the OLT receives the third clock packet.

The second monitoring unit is further configured to:

regard the last bit of the Delimiter field in the frame header of the GTC TC frame of the third upstream frame at the GTC framing sub-layer as the packet time stamp generating point; or regard the last bit of the HEC field in the frame header of the GEM frame of the third upstream frame at the TC adapter sub-layer as the packet time stamp generating point; or regard the last bit of the PLOu field in the frame header of the GTC TC frame of the third upstream frame at the GTC framing sub-layer as the packet time stamp generating point.

The optical network device on the slave clock side according to the embodiment of the present invention monitors the packet time stamp generating point based on the lower layer and acquires the time a clock packet is received on the slave clock side at the packet time stamp generating point. Therefore, the optical network device on the slave clock side supports multiple modes of clock packet encapsulation over the PON transmission frame, for example, the application of IEEE 1588 in case of Ethernet over GEM. Thus, time is synchronized in the network. In addition, the packet time stamp generating point is determined at the lower layer (GTC framing sub-layer or TC adapter sub-layer) of the PON and thus the precision and accuracy of the generated time stamp are improved.

Figure 20:
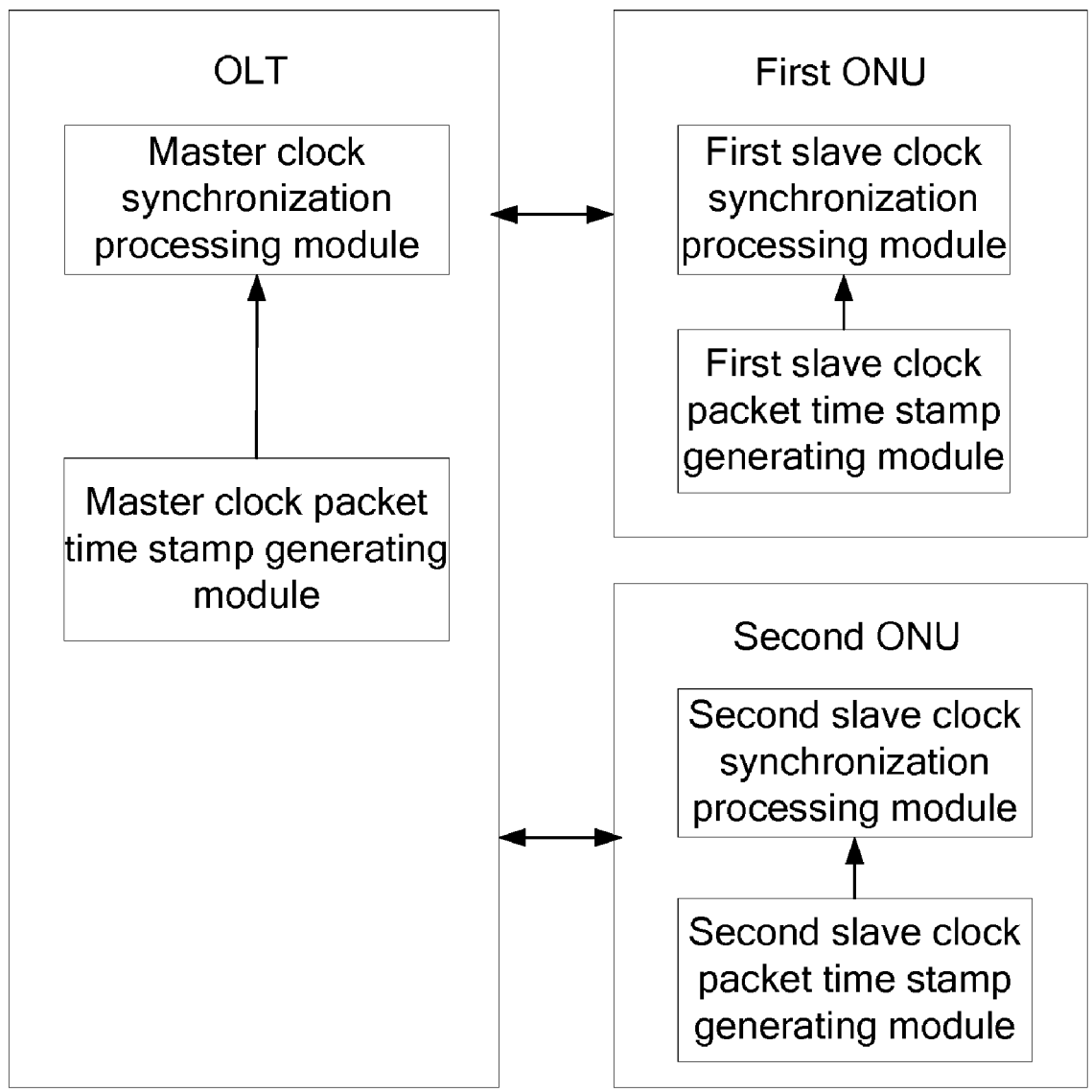
FIG. 20 is a structure of an optical communications system according to an embodiment of the present invention.

Another embodiment of the present invention provides a point-to-multipoint optical communications system. As shown in FIG. 20, the point-to-multipoint optical communications system according to the embodiment of the present invention includes an OLT and at least one ONU coupled to the OLT.

The OLT includes:

a master clock synchronization processing module, configured to send a first clock packet carried in a first downstream frame and a second clock packet carried in a second downstream frame to the ONU, where the second clock packet carries the time stamp when the OLT sends the first clock packet; and a master clock packet time stamp generating module, configured to acquire the time the OLT sends the first clock packet according to the frame data of the first clock packet at the PON MAC layer.

The ONU includes:

a slave clock synchronization processing module, configured to receive the first clock packet and the second clock packet, where the second clock packet carries the time stamp when the OLT sends the first clock packet, and adjust the time of the ONU according to the difference between the time the OLT sends the first clock packet and the time the ONU receives the first clock packet; and a slave clock packet time stamp generating module, configured to acquire the time the ONU receives the first clock packet according to the frame data of the first clock packet at the PON MAC layer.

Optionally, the master clock synchronization processing module is further configured to receive a third clock packet and send a fourth clock packet, where the fourth clock packet carries the time stamp when the OLT receives the third clock packet.

The master clock packet time stamp generating module is further configured to acquire the time the OLT receives the third clock packet according to the frame data of the third clock packet at the PON MAC layer.

The slave clock synchronization processing module is further configured to send the third clock packet; receive from the OLT the fourth clock packet which carries the time stamp when the OLT receives the third clock packet; and correct the time of the ONU according to the difference between the time the ONU sends the third clock packet and the time the OLT receives the third clock packet.

The slave clock packet time stamp generating module is further configured to acquire the time the ONU sends the third clock packet according to the frame data of the third clock packet at the PON MAC layer.

The optical communications system according to the embodiment of the present invention monitors the packet time stamp generating point based on the lower layer and then determines the time a clock packet is sent and received on the master clock side according to the packet time stamp generating point. Therefore, the optical communications system supports multiple modes of clock packet encapsulation based on the PON transmission frame, for example, the application of IEEE 1588 in case of Ethernet over GEM. Thus, time is synchronized in the network. In addition, the packet time stamp generating point is determined at the lower layer (GTC framing sub-layer or TC adapter sub-layer) of the PON and thus the precision and accuracy of the generated time stamp are improved.

The application of the optical communications system in the embodiment of the present invention is described hereinafter.

Figure 21:
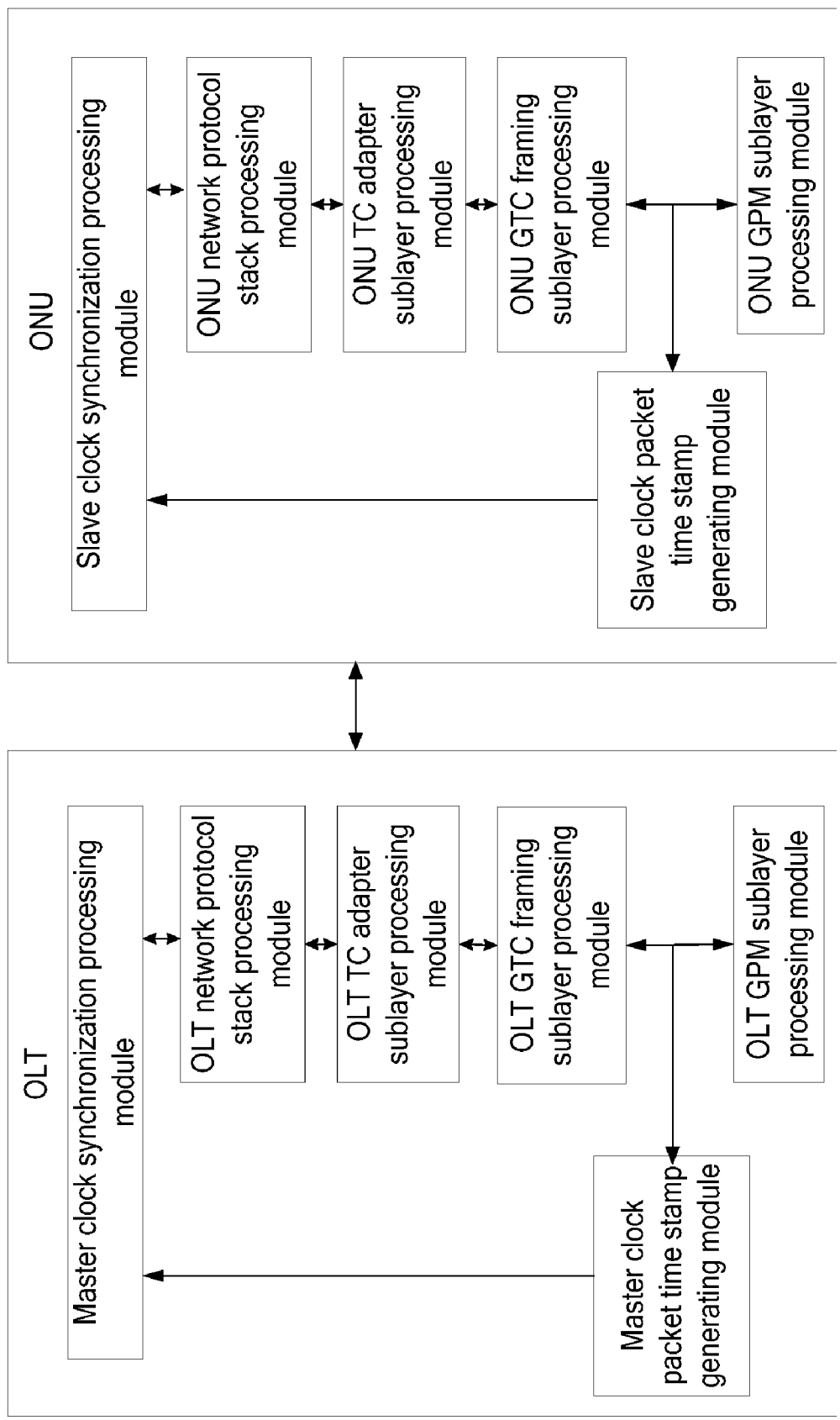
FIG. 21 illustrates a first application of an optical communications system according to an embodiment of the present invention.

FIG. 21 illustrates a first application of the optical communications system according to an embodiment of the present invention, where the first, second, third, and fourth clock packets are carried over an Ethernet protocol. On the master clock side, the OLT includes a master clock packet time stamp generating module, a master clock synchronization processing module, an OLT GPM sub-layer processing module, an OLT GTC framing sub-layer processing module, an OLT TC adapter sub-layer processing module, and an OLT network protocol stack processing module. The master clock packet time stamp generating module is configured to determine the position of the master clock packet time stamp generating point and generate time stamp information according to the GTC TC frame header at the GTC framing sub-layer. The master clock synchronization processing module is configured to complete IEEE 1588 protocol processing and exchange clock packets with the OLT to determine the time a clock packet is sent or received according to the time stamp. The network protocol stack processing module is configured to process the protocol stack carrying the clock packets. The protocol stack may be ETH, IP or UDP. On the slave clock side, the ONU includes a slave clock packet time stamp generating module, a slave clock synchronization processing module, an ONU GPM sub-layer processing module, an ONU GTC framing sub-layer processing module, an ONU TC adapter sub-layer processing module, and an ONU network protocol stack processing module. The slave clock packet time stamp generating module is configured to determine the position of the slave clock packet time stamp generating point and generate time stamp information according to the GTC TC frame header at the GTC framing sub-layer. The slave clock synchronization processing module is configured to complete IEEE 1588 protocol processing and exchange clock packets with the OLT to determine the time a clock packet is sent and received according to the time stamp. The ONU network protocol stack processing module is configured to process the protocol stack carrying the clock packets. The protocol stack may be ETH, IP or UDP.

Figure 22:
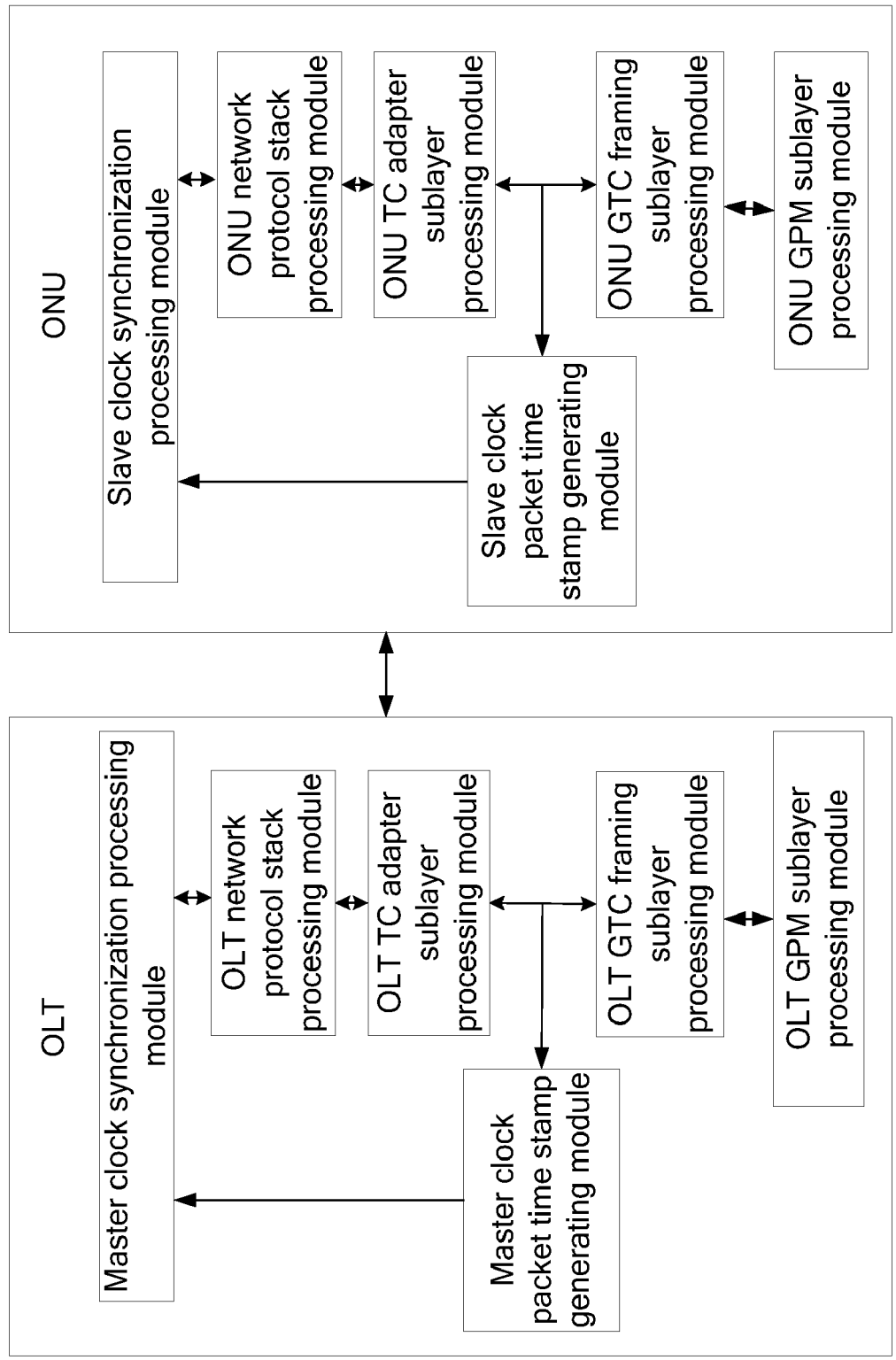
FIG. 22 illustrates a second application of an optical communications system according to an embodiment of the present invention.

FIG. 22 illustrates a second application of the optical communications system according to an embodiment of the present invention, where the first, second, third, and fourth clock packets are carried over an Ethernet protocol. FIG. 22 differs from FIG. 21 in that: on the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 23:
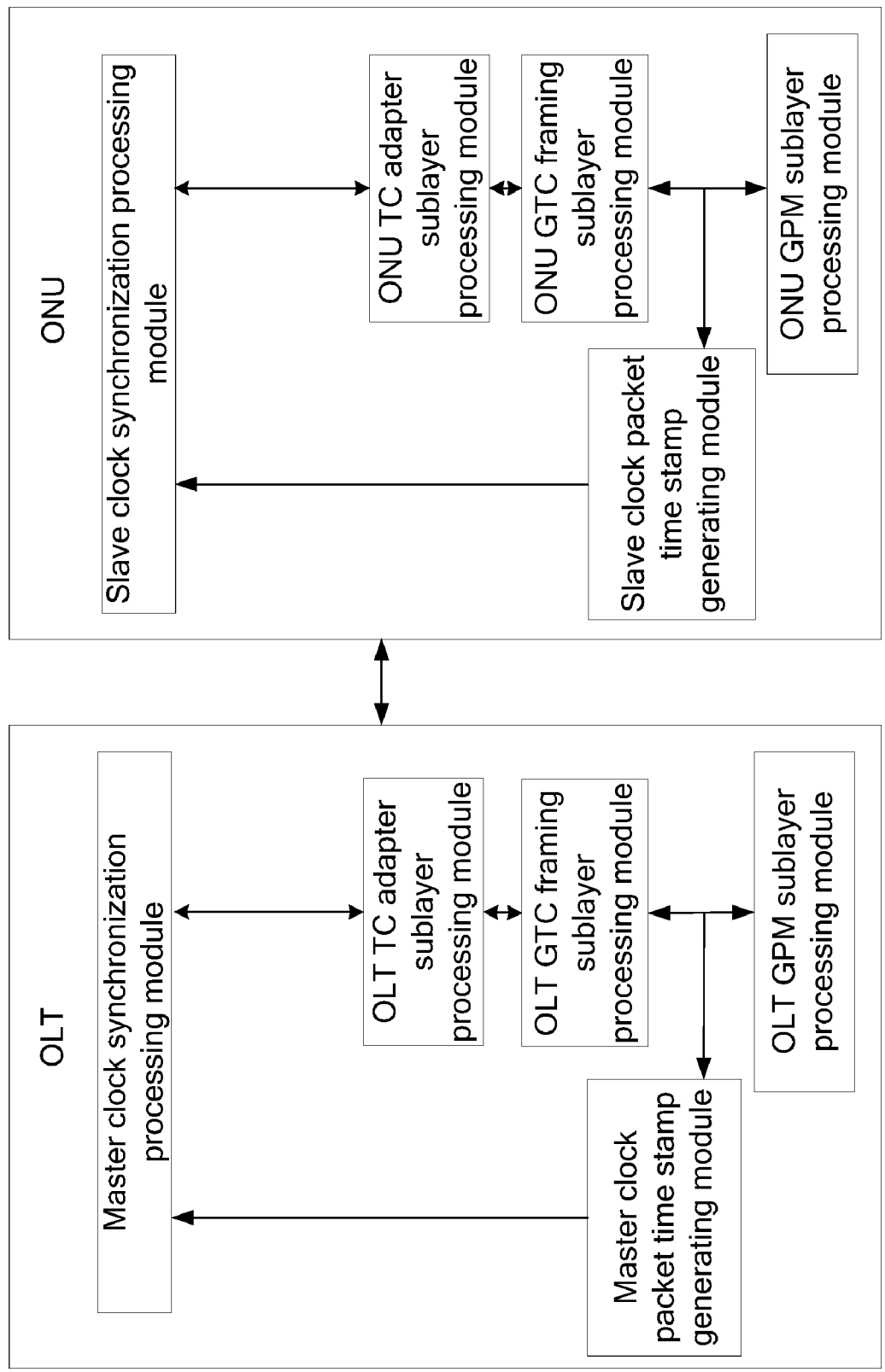
FIG. 23 illustrates a third application of an optical communications system according to an embodiment of the present invention.

FIG. 23 illustrates a third application of the optical communications system according to an embodiment of the present invention. The first, second, third, and fourth clock packet are carried in IEEE 1588/1588v2 over GEM mode. On the master clock side, the OLT includes a master clock packet time stamp generating module, a master clock synchronization processing module, an OLT GPM sub-layer processing module, an OLT GTC framing sub-layer processing module, and an OLT TC adapter sub-layer processing module. The master clock packet time stamp generating module is configured to determine the position of the master clock packet time stamp generating point and generate time stamp information according to the GTC TC frame header at the GTC framing sub-layer. The ONU includes a slave clock packet time stamp generating module, a slave clock synchronization processing module, an ONU GPM sub-layer processing module, an ONU GTC framing sub-layer processing module, and an ONU TC adapter sub-layer processing module. The slave clock packet time stamp generating module is configured to determine the position of the slave clock packet time stamp generating point and generate time stamp information according to the GTC TC frame header at the GTC framing sub-layer.

Figure 24:
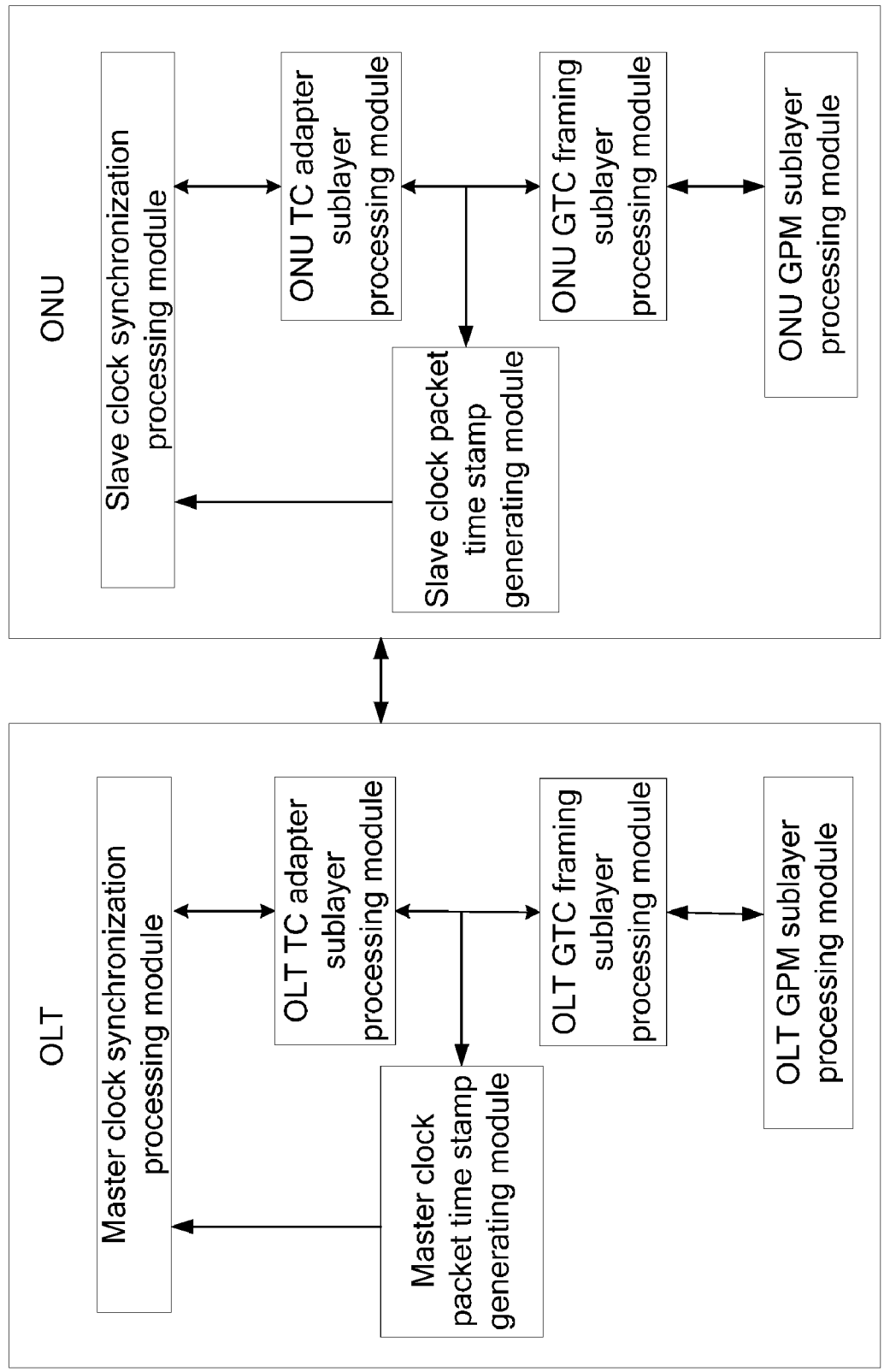
FIG. 24 illustrates a fourth application of an optical communications system according to an embodiment of the present invention.

FIG. 24 illustrates a fourth application of the optical communications system according to an embodiment of the present invention, where the first, second, third, and fourth clock packets are carried in IEEE 1588/1588v2 over GEM mode. FIG. 24 differs from FIG. 23 in that: on the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 25:
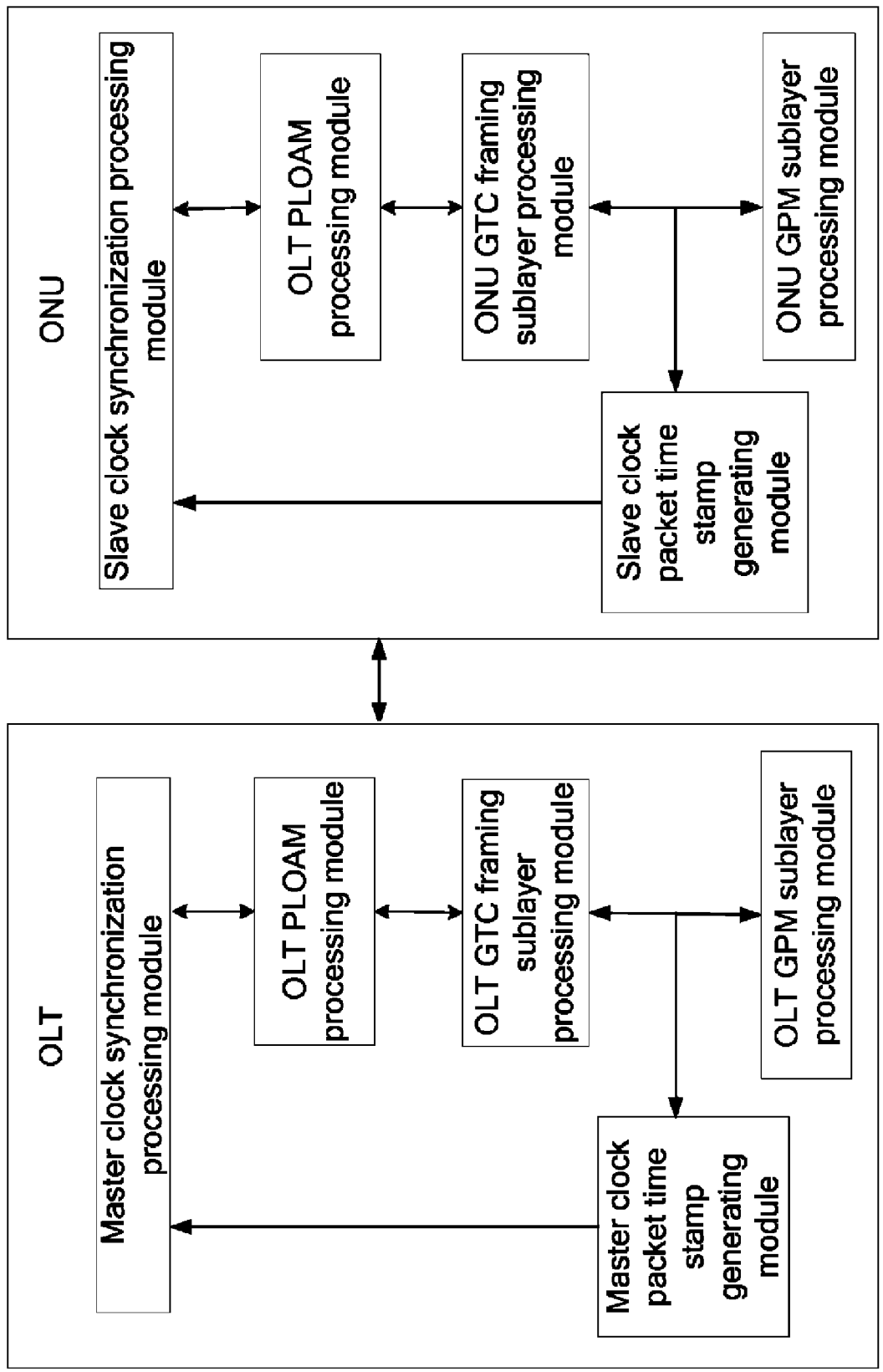
FIG. 25 illustrates a fifth application of an optical communications system according to an embodiment of the present invention.

FIG. 25 illustrates a fifth application of the optical communications system according to an embodiment of the present invention, where the clock packets are carried in PLOAM messages. On the master clock side, the OLT includes a master clock packet time stamp generating module, a master clock synchronization processing module, an OLT PLOAM processing module, an OLT GPM sub-layer processing module, and an OLT GTC framing sub-layer processing module. The master clock packet time stamp generating module is configured to determine the position of the master clock packet time stamp generating point and generate time stamp information according to the GTC TC frame header at the GTC framing sub-layer. On the slave clock side, the ONU includes a slave clock packet time stamp generating module, a slave clock synchronization processing module, an ONU PLOAM processing module, an ONU GPM sub-layer processing module, and an ONU GTC framing sub-layer processing module. The slave clock packet time stamp generating module is configured to determine the position of the slave clock packet time stamp generating point and generate time stamp information according to the GTC TC frame header at the GTC framing sub-layer.

Figure 26:
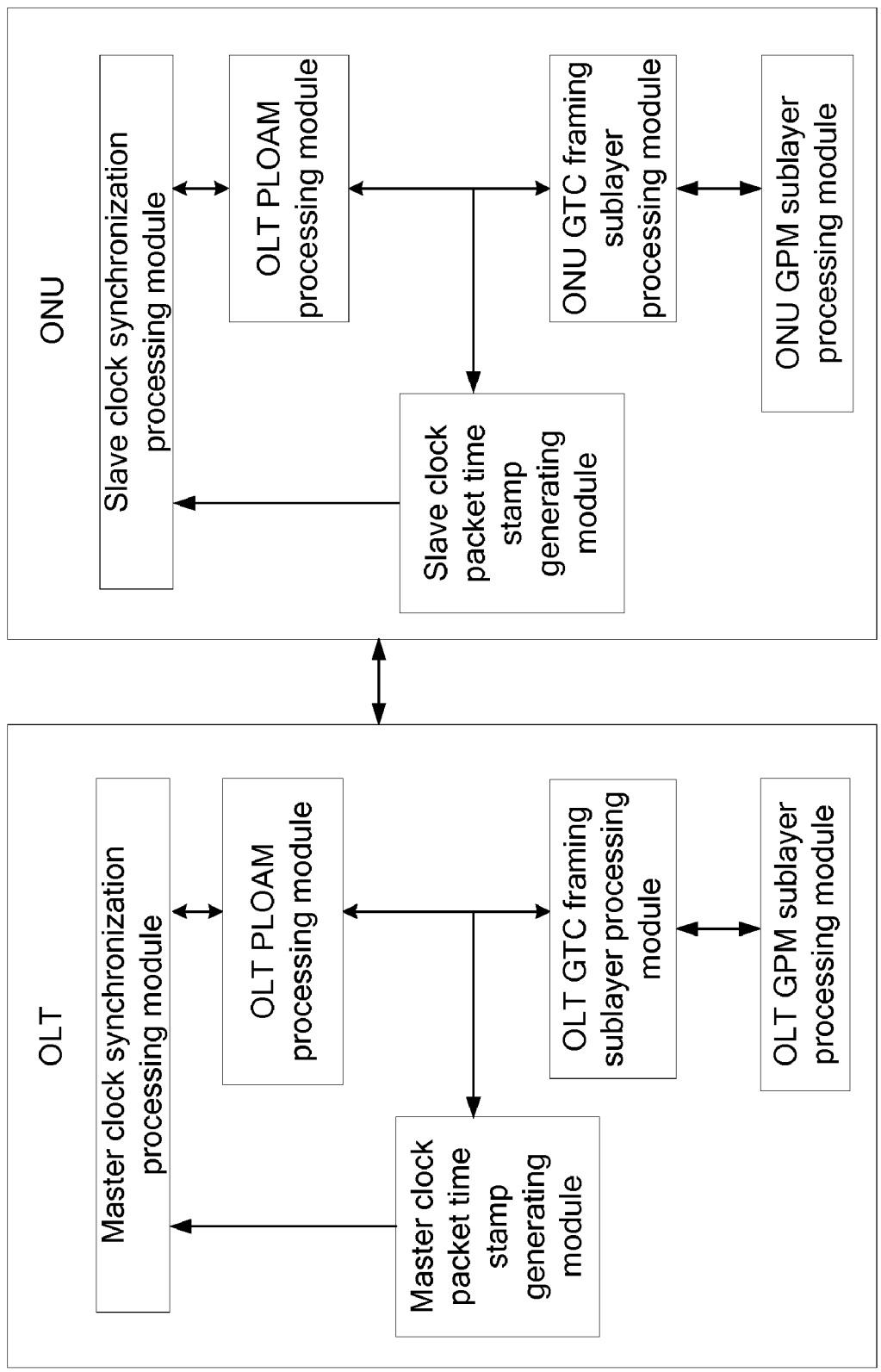
FIG. 26 illustrates a sixth application of an optical communications system according to an embodiment of the present invention.

FIG. 26 illustrates a sixth application of the optical communications system according to an embodiment of the present invention, where the clock packets are carried in PLOAM messages. FIG. 26 is different from FIG. 25 in that: On the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 27:
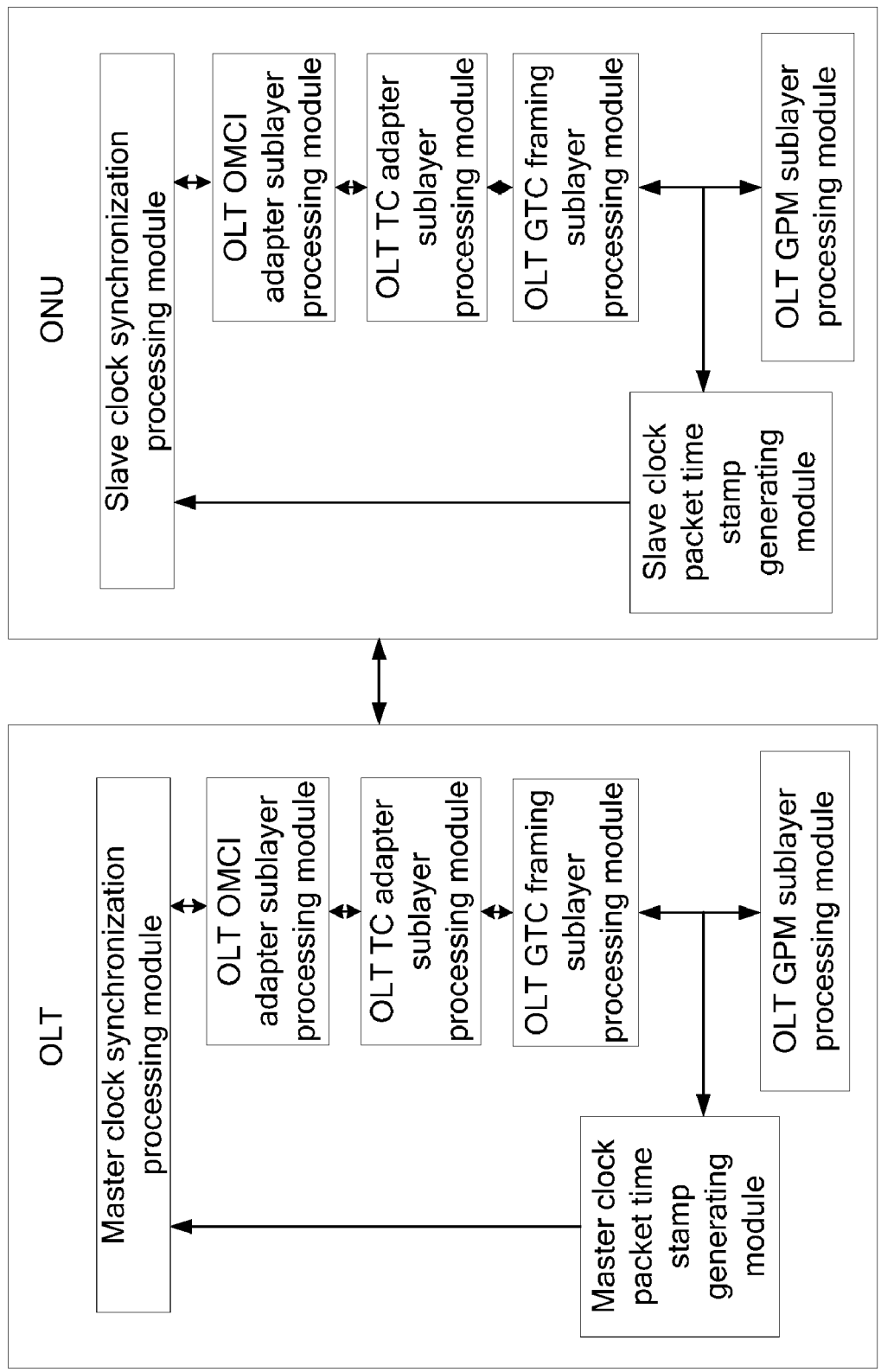
FIG. 27 illustrates a seventh application of an optical communications system according to an embodiment of the present invention.

FIG. 27 illustrates a seventh application of the optical communications system according to an embodiment of the present invention, where the clock packets are carried in OMCI messages. On the master clock side, the OLT includes a master clock packet time stamp generating module, a master clock synchronization processing module, an OLT GPM sub-layer processing module, an OLT GTC framing sub-layer processing module, an OLT TC adapter sub-layer processing module, and an OLT OMCI adapter sub-layer processing module. The master clock packet time stamp generating module is configured to determine the position of the master clock packet time stamp generating point and generate time stamp information according to the GTC TC frame header at the GTC framing sub-layer. On the slave clock side, the ONU includes a slave clock packet time stamp generating module, a slave clock synchronization processing module, an ONU GPM sub-layer processing module, an ONU GTC framing sub-layer processing module, an ONU TC adapter sub-layer processing module, and an ONU OMCI adapter sub-layer processing module. The slave clock packet time stamp generating module is configured to determine the position of the slave clock packet time stamp generating point and generate time stamp information according to the GTC TC frame header at the GTC framing sub-layer.

Figure 28:
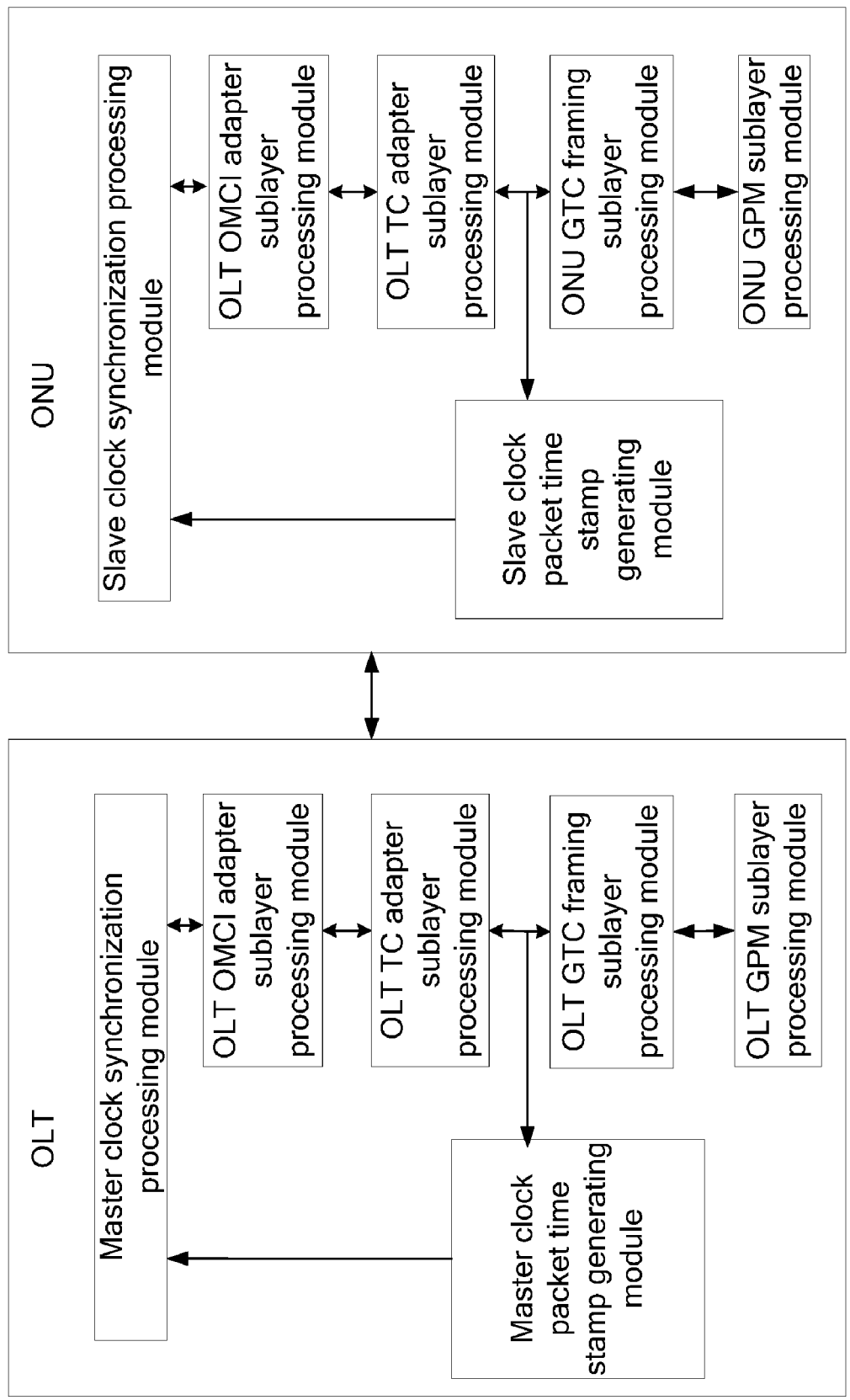
FIG. 28 illustrates an eighth application of an optical communications system according to an embodiment of the present invention.

FIG. 28 illustrates an eighth application of the optical communications system according to an embodiment of the present invention, where the clock packets are carried in OMCI messages. FIG. 28 differs from FIG. 27 in that: At the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Those skilled in the art would understand that the synchronization method, optical network device, and optical communications system according to the embodiments of the present invention are applicable not only to GPON systems but also to other xPON systems.

Through the descriptions of the preceding embodiments, those skilled in the art may understand that the present invention may be implemented by hardware only or by a combination of hardware and software.

Although the present invention has been described with reference to specific embodiments thereof, it will be evident that various changes and modifications can be made thereto without departing from the spirit and scope of the invention. The specification and drawings are, accordingly, to be regarded simply as an illustration of the invention as defined by the appended claims.

What is claimed is:

1. A method for synchronizing time in a Gigabit Passive Optical Network (GPON), comprising:
sending, by an Optical Line Terminal (OLT), a downstream frame including a Physical Control Block downstream (PCBd) field and a payload field to an Optical Network Unit (ONU);
determining, by the OLT, a time value associated with a certain bit in the PCBd field of the downstream frame; and
sending, by the OLT, an Operation, Administration and Maintenance (OAM) message defined by a GPON protocol carrying the time value to the ONU, wherein the time value is used by the ONU to adjust a local time of the ONU.

2. The method of claim 1, wherein the time value is a time stamp.

3. The method of claim 2, wherein the local time of the ONU is adjusted according to a difference between the time stamp and another time value.

4. The method of claim 1, wherein the OAM message is an ONU Management and Control Interface (OMCI) message.

5. The method of claim 1, wherein the OAM message is a Physical Layer Operation, Administration and Maintenance (PLOAM) message.

6. The method of claim 1, wherein the certain bit in the PCBd field of the downstream frame is the last bit of a Psync field in the PCBd field of the downstream frame.

7. The method of claim 1, wherein the downstream frame is a GPON Transmission Convergence layer (GTC) TC frame.

8. A method for synchronizing time in a Gigabit Passive Optical Network (GPON), comprising:
receiving, by an Optical Network Unit (ONU), a downstream frame including a Physical Control Block downstream (PCBd) field and a payload field from an Optical Line Terminal (OLT);
acquiring, by the ONU, a time value associated with a certain bit in the PCBd field of the downstream frame from the OLT via an Operation, Administration and Maintenance (OAM) message defined by a GPON protocol; and
adjusting a local time of the ONU based on the time value.

9. The method of claim 8, wherein the time value is a time stamp.

10. The method of claim 9, wherein the local time of the ONU is adjusted according to a difference between the time stamp and another time value.

11. The method of claim 8, wherein the OAM message is an ONU Management and Control Interface (OMCI) message.

12. The method of claim 8, wherein the OAM message is carried in a Physical Layer Operation, Administration and Maintenance (PLOAM) message.

13. The method of claim 8, wherein the certain bit in the PCBd field of the downstream frame is the last bit of a Psync field in the PCBd field of the downstream frame.

14. The method of claim 8, wherein the downstream frame is a GPON Transmission Convergence layer (GTC) TC frame.

15. An optical network device, comprising:
a processing unit; and
a sending unit coupled to the processing unit,
wherein the processing unit and sending unit are jointly configured to:
send a downstream frame including a Physical Control Block downstream (PCBd) field and a payload field to an Optical Network Unit (ONU);
determine a time value associated with a certain bit in the PCBd field of the downstream frame; and
send an Operation, Administration and Maintenance (OAM) message defined by a GPON protocol carrying the time value to the ONU, wherein the time value is used by the ONU to adjust a local time of the ONU.

16. The optical network device of claim 15, wherein the time value is a time stamp.

17. The optical network device of claim 16, wherein the local time of the ONU is adjusted according to a difference between the time stamp and another time value.

18. The optical network device of claim 15, wherein the OAM message is an ONU Management and Control Interface (OMCI) message.

19. The optical network device of claim 15, wherein the OAM message is a Physical Layer Operation, Administration and Maintenance (PLOAM) message.

20. The optical network device of claim 15, wherein the certain bit in the PCBd field of the downstream frame is the last bit of a Psync field in the PCBd field of the downstream frame.

21. The optical network device of claim 15, wherein the downstream frame is a GPON Transmission Convergence layer (GTC) TC frame.

22. An optical network device, comprising:
a receiving unit; and
a processing unit coupled to the receiving unit, wherein the receiving unit and processing unit are jointly configured to:
receive a downstream frame including a Physical Control Block downstream (PCBd) field and a payload field from an Optical Line Terminal (OLT);
acquire a time value associated with a certain bit in the PCBd field of the downstream frame from the OLT via an Operation, Administration and Maintenance (OAM) message defined by a GPON protocol; and
adjust a local time of the ONU based on the time value.

23. The optical network device of claim 22, wherein the time value is a time stamp.

24. The optical network device of claim 23, wherein the local time of the ONU is adjusted according to a difference between the time stamp and another time value.

25. The optical network device of claim 22, wherein the OAM message is an ONU Management and Control Interface (OMCI) message.

26. The optical network device of claim 22, wherein the OAM message is a Physical Layer Operation, Administration and Maintenance (PLOAM) message.

27. The optical network device of claim 22, wherein the certain bit in the PCBd field of the downstream frame is the last bit of a Psync field in the PCBd field of the downstream frame.

28. The optical network device of claim 22, wherein the downstream frame is a GPON Transmission Convergence layer (GTC) TC frame.

\* \* \* \* \*